(12) United States Patent
Yan et al.

(10) Patent No.: US 7,916,841 B2
(45) Date of Patent: Mar. 29, 2011

(54) METHOD AND APPARATUS FOR JOINT DETECTION

(75) Inventors: Aiguo Yan, North Andover, MA (US); Lidwine Martinot, Cottenham (GB); Marko Kocic, Somerville, MA (US); Paul D. Krivacek, North Andover, MA (US); Thomas J. Barber, Jr., Bolton, MA (US); John Zijun Shen, Winchester, MA (US)

(73) Assignee: MediaTek Inc., Hsin-Chu (TW)

( * ) Notice: Subject to any disclaimer, the term of this patent is extended or adjusted under 35 U.S.C. 154(b) by 1134 days.

(21) Appl. No.: 11/545,857

(22) Filed: Oct. 11, 2006

(65) Prior Publication Data
US 2008/0080638 A1 Apr. 3, 2008

Related U.S. Application Data

(60) Provisional application No. 60/848,157, filed on Sep. 29, 2006.

(51) Int. Cl.
H04M 1/64 (2006.01)
H04L 25/49 (2006.01)

(52) U.S. Cl. ............... 379/88.07; 358/1.15; 375/231; 375/286; 375/340; 455/278.1

(58) Field of Classification Search .......... 370/335, 370/342, 385; 375/140, 147, 219, 229, 286, 375/295, 231, 340; 379/88.07; 358/1.15; 455/278.1
See application file for complete search history.

(56) References Cited

U.S. PATENT DOCUMENTS

| | | | | |
|---|---|---|---|---|
| 5,970,060 | A * | 10/1999 | Baier et al. | 370/342 |
| 6,339,612 | B1 * | 1/2002 | Stewart et al. | 375/140 |
| 7,031,284 | B2 * | 4/2006 | Supplee et al. | 370/335 |
| 7,076,227 | B1 * | 7/2006 | Smith | 455/278.1 |
| 7,095,731 | B2 * | 8/2006 | Kim et al. | 370/342 |
| 7,173,961 | B2 * | 2/2007 | Vadde | 375/219 |
| 7,212,566 | B2 * | 5/2007 | Zhang et al. | 375/229 |
| 7,295,596 | B2 * | 11/2007 | Misra et al. | 375/147 |

(Continued)

FOREIGN PATENT DOCUMENTS

| | | |
|---|---|---|
| EP | 1 139 576 A | 10/2001 |
| GB | 2 375 464 A | 11/2002 |

OTHER PUBLICATIONS

International Preliminary Report of Patentability dated Apr. 9, 2009 in corresponding PCT application No. PCT/US2007/020828.
Martinez, Ed, "Introduction to TD-SCDMA on the MRC6011 RCF Device", Freescale Semiconductor, Application Note, AN2684, Rev. 1 Nov. 2004, pp. 1-16.
Siemens, "White Paper TD-SCDMA: the Solution for TDD bands", pp. 1-39, Mar. 2004.

(Continued)

Primary Examiner — Gerald Gauthier
(74) Attorney, Agent, or Firm — Fish & Richardson P.C.

(57) ABSTRACT

A joint detection system and associated methods are provided. The joint detection system is configured to perform joint detection of received signals and includes a joint detector accelerator and a programmable digital signal processor (DSP). The joint detector accelerator is configured to perform front-end processing of first data inputted to the joint detector accelerator and output second data resulting from the front-end processing. The joint detector accelerator is further configured to perform back-end processing using at least third data inputted to the joint detector accelerator. The programmable DSP is coupled to the joint detector accelerator, and the programmable DSP is programmed to perform at least one intermediate processing operation using the second data outputted by the joint detector accelerator. The programmable DSP is further programmed to output the third data resulting from the intermediate processing operation to the joint detector accelerator.

28 Claims, 14 Drawing Sheets

U.S. PATENT DOCUMENTS

| | | | |
|---|---|---|---|
| 7,471,734 B2* | 12/2008 | Thomas et al. | 375/295 |
| 7,539,272 B2* | 5/2009 | Chen et al. | 375/340 |
| RE40,777 E* | 6/2009 | Jarbot et al. | 370/465 |
| 7,564,891 B2* | 7/2009 | Li | 375/147 |
| 7,626,715 B2* | 12/2009 | Mastie et al. | 358/1.15 |
| 7,724,816 B2* | 5/2010 | Chen et al. | 375/231 |
| 2002/0110108 A1* | 8/2002 | Kim et al. | 370/342 |
| 2003/0191887 A1 | 10/2003 | Oates et al. | |
| 2003/0231702 A1 | 12/2003 | Oates et al. | |
| 2004/0052236 A1 | 3/2004 | Hwang et al. | |
| 2004/0252793 A1 | 12/2004 | Chang | |
| 2005/0164732 A1 | 7/2005 | Denk et al. | |
| 2006/0010188 A1 | 1/2006 | Solomon et al. | |
| 2006/0084425 A1 | 4/2006 | Cheng et al. | |
| 2008/0080468 A1* | 4/2008 | Shen et al. | 370/342 |
| 2009/0129445 A1* | 5/2009 | Korhonen | 375/147 |

OTHER PUBLICATIONS

Li, Bo et al., "*Recent Advances on TD-SCDMA in China*", IEEE Communications Magazine, Jan. 2005 pp. 30-37.

Vollmer Marius, et al., "*Comparative Study of Joint-Detection Techniques for TD-CDMA Based Mobile Radio Systems*", IEEE Journal on Selected Areas in Communications, vol. 19, No. 8, Aug. 2001, pp. 1461-1475.

Sheng, Chengke, et al., "*Spatial Temporal Processing in TD-SCDMA*", Motorola Freescale Semiconductor, Inc., White Paper, AN2904, Rev. 0, Sep. 2004, pp. 1-23.

Sheng, Chengke, et al., "*ZF-BLE Joint Detection for TD-SCDMA*", Motorola Freescale Semiconductor, Inc., pp. 1-20, Feb. 19, 2004.

ST Journal of System Research, Wireless Communications, vol. 1-No. 1, Feb. 2004, pp. 1-124.

* cited by examiner

METHOD AND APPARATUS FOR JOINT DETECTION

RELATED APPLICATIONS

This application claims priority under 35 U.S.C. §119(e) to U.S. Provisional Application Ser. No. 60/848,157, filed on Sep. 29, 2006 and entitled "Method and Apparatus for Joint Detection", which is herein incorporated by reference in its entirety.

FIELD OF THE INVENTION

The present application relates to joint detection methods and circuits for wireless communication.

BACKGROUND

TD-SCDMA (Time Division Synchronized Code Division Multiple Access) is a wireless communication standard that combines TDD/TDMA (Time Division Duplexing/Time Division Multiple Access) operation with synchronous CDMA (Code Division Multiple Access). TD-SCDMA can assign users to different time slots and spreading codes, whereby each time slot can contain data associated with different users distinguished by a distinct spreading code. FIG. 1 illustrates a TD-SCDMA scheme 100 wherein a frequency band 110 may be used for communication associated with multiple users via the assignment of users to different time slots 121, 122, 123, 124, etc. and different spreading codes 1, 2, 3, etc. (e.g., up to 16 spreading codes may be utilized by a TD-SCDMA slot). Current TD-SCDMA utilizes up to 16 spreading codes per time slot, such that a maximum of 16 users may be simultaneously allocated different spreading codes in a given time slot. In some instances, a user may be allocated multiple spreading codes.

TD-SCDMA supports asymmetric traffic and services, whereby uplink and downlink traffic allocations are modified using a flexible frame structure that enables uplink and downlink allocations to be dynamically modified during a call. TD-SCDMA also allows for multiple access interference (MAI) to be reduced using joint detection and smart antenna systems. In a joint detection scheme, data from multiple users that may be associated with a time slot are estimated in parallel and a specific user's data is extracted from a received signal. In this way, interference due to signals associated with other users is accounted for and data provided to a user can exhibit reduced interference.

SUMMARY

In one aspect, a joint detection system is configured to perform joint detection of received signal. The joint detection system comprises a joint detector accelerator configured to perform front-end processing of first data inputted to the joint detector accelerator and output second data resulting from the front-end processing, and wherein the joint detector accelerator is further configured to perform back-end processing using at least third data inputted to the joint detector accelerator. The joint detection system further comprises a programmable digital signal processor (DSP) coupled to the joint detector accelerator, wherein the programmable DSP is programmed to perform at least one intermediate processing operation using the second data outputted by the joint detector accelerator, and wherein the programmable DSP is further programmed to output the third data resulting from the at least one intermediate processing operation to the joint detector accelerator.

In another aspect, a joint detector accelerator is configured to perform at least some processing associated with joint detection of received signals. The joint detector accelerator comprises a processor configured to perform front-end processing of first data inputted to the joint detector accelerator and output second data resulting from the front-end processing, and perform back-end processing using at least third data inputted to the joint detector accelerator, wherein the third data is at least partially based on the second data.

In another aspect, a method is provided for performing joint detection of received signals using a joint detector accelerator. The method comprises receiving first data using the joint detector accelerator. The method further comprises performing, using the joint detector accelerator, front-end processing of the first data resulting in second data, wherein the front-end processing includes at least some operations of the joint detection of the received signal. The method further comprises outputting, using the joint detector accelerator, second data resulting from the front-end processing. The method further comprises receiving, using the joint detector accelerator, third data at least partially based on the second data, and performing, using the joint detector accelerator, back-end processing using at least the third data, wherein the back-end processing includes at least some other operations of the joint detection of the received signal.

Other aspects, embodiments and features of the invention will become apparent from the following detailed description of the invention when considered in conjunction with the accompanying figures. The accompanying figures are schematic and are not intended to be drawn to scale. In the figures, each identical or substantially similar component that is illustrated in various figures is represented by a single numeral or notation.

For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF DRAWINGS

In the drawings, in which like reference numerals represent like elements.

DETAILED DESCRIPTION

Figure 1:
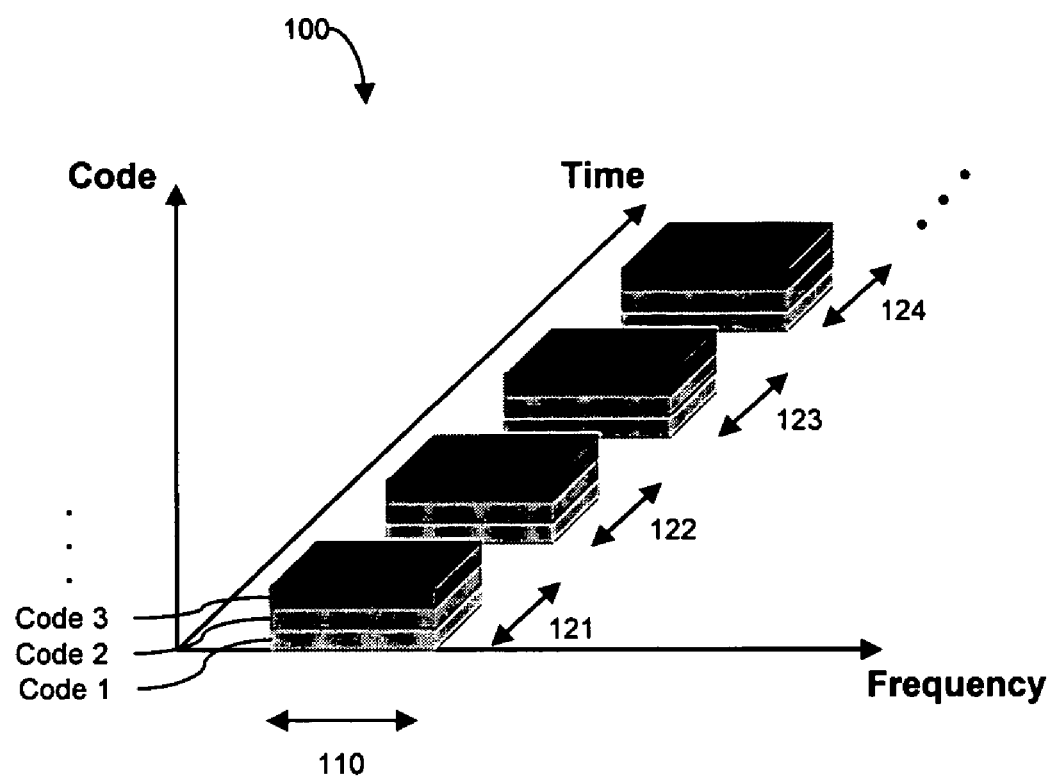
FIG. 1 is a schematic of TD-SCDMA time slots and spreading codes.

A joint detection system may be implemented as a software solution, for example, using a digital signal processor (DSP), or via a hardware solution, in the form of a circuit referred to as a joint detection accelerator (JDA). In contrast to joint detection systems implemented in software, a JDA allows for reduced power consumption and increased operation speed.

Applicants have appreciated that joint detection systems can include some processing operations that may benefit from the flexibility of a programmable software implementation and other processing operations may benefit from the reduced power consumption and speed of a JDA. Operations implemented in a JDA may include mature algorithms that are not likely to change and are not prone to customization by different handset manufacturers. Conversely, operations implemented in a programmable DSP may include algorithms that are likely to change and are prone to customization by different handset manufacturers.

Applicants have also appreciated that a JDA may benefit from a fixed point implementation that can reduce chip area and power consumption, while meeting performance specifications, such as block error rate performance. Reducing a data bit-width of a fixed point implementation may in turn enable both reduced chip area and reduced power consumption. Furthermore, a reduced bit-width implies that processing can execute in less time, and therefore longer periods of chip sleep or idle modes are possible. Applicants have realized that a JDA having a reduced data bit-width can still retain high precision during multiply and accumulate operations by performing operations in an accumulator that has a large number of bits, and only saving a reduced number of bits into memory. Applicants have further appreciated that one or more shift values may be determined internally by the JDA and/or configured by an external source, such as a programmable DSP.

Applicants have further appreciated that current initial channel estimation in joint detection systems may demand a large bit-width to accommodate differences in the amplitude of each channel. Such a situation may arise as a result of the manner in which channel estimation is performed. For example, in TD-SCDMA systems, one or more midambles are provided in each burst, and the receiver utilizes midambles to estimate the propagation channel between the transmitter and receiver. However, the receiver performs an initial channel estimation, in which differences between the power levels of midambles and the number of midambles may not be accounted for. Although such discrepancies are ultimately accounted for using scaling factors generated by an active code detection algorithm, the channel estimates generated by the initial channel estimate may demand a larger bit-width, in a fixed point implementation of a JDA, than would otherwise be necessary if the aforementioned effects were accounted for initially. Applicants have realized that a joint detection system may benefit from a pre-scaling of one or more propagation channels prior to being sent to a JDA, thereby allowing for a reduced bit-width in a fixed point implementation of a JDA.

It should be appreciated that the techniques presented herein may be implemented in any way, as they are not limited to any particular implementation. Examples of implementations are discussed below, but it should be understood that these implementations are presented simply as illustrative examples, and the embodiments may be implemented in other ways. The examples presented below are described for use in a joint detection system that may be used with a TD-SCDMA scheme. However it should be appreciated that the techniques described herein may be used with other suitable communication schemes, and/or with other joint detection systems that may be implemented in numerous ways, and are not limited to use with any particular type of joint detection system.

As discussed below, one application for the techniques described herein is for use with a joint detection system in a TD-SCDMA receiver. However, this example is merely illustrative, as the techniques described herein can be used with any suitable types of system wherein joint detection of received signals may be performed.

Figure 2:
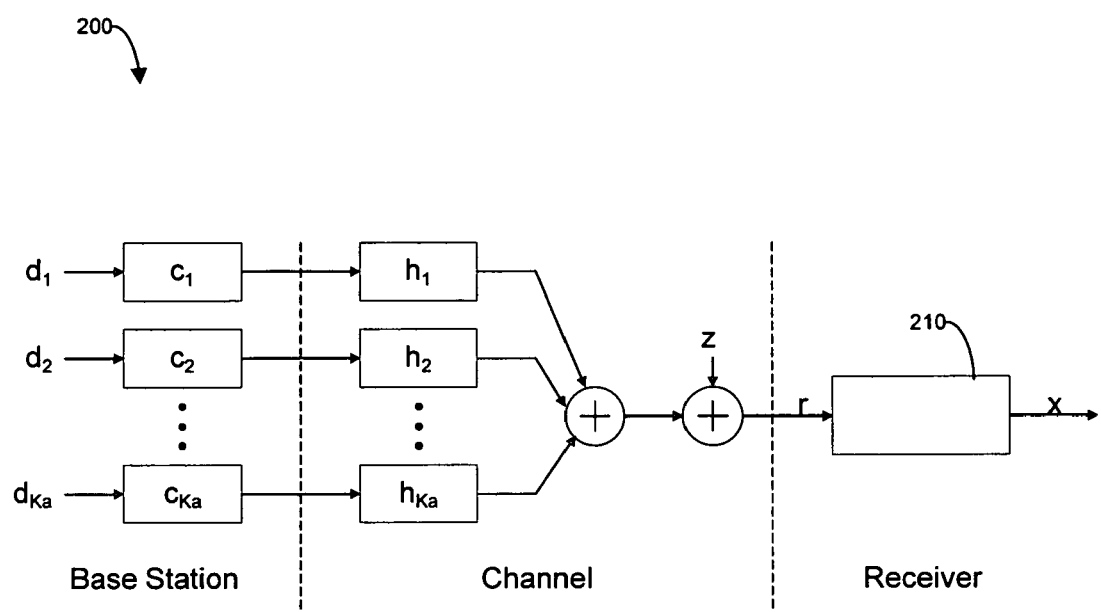
FIG. 2 is a schematic of a TD-SCDMA downlink channel model.

As illustrated in FIG. 2, a TD-SCDMA downlink channel model 200 can include channelization and scrambling codes $c_1, c_2, \ldots, c_{Ka}$, channel impulse responses $h_1, h_2, \ldots, h_{Ka}$, random noise z added to the channels, and a joint detection data receiver 210. Data $d_1, d_2, \ldots, d_{Ka}$ is respectively multiplied by the channelization and scrambling codes $c_1, c_2, \ldots, c_{Ka}$ in the base station and transmitted into the channel. Each code channel can be modeled as an impulse response $h_1, h_2, \ldots, h_{Ka}$ followed by noise z. Due to the use of smart antennas, the channel impulse response for each code channel can be independent. Received data r is sampled by an analog portion of the receiver 210 and inputted to a joint detection system of the receiver 210. Output x of the joint detection system includes user data which may be further decoded by a downlink bit rate processor.

The cumulative effect of the channelization/scrambling codes and the channel impulse response is the convolution of the channelization/scrambling codes $c_x$ and channel impulse response $h_x$. The cumulative effect of all of the channels over a single data symbol may be represented by a matrix V wherein the columns of the matrix V are the convolution of a channelization/scrambling code and the channel impulse response for that code channel. The number of columns of matrix V is the number of active code channels $K_a$. A combined response matrix T over the entire data field can be constructed by arranging the V matrix along the diagonal of the T matrix.

Figure 3:
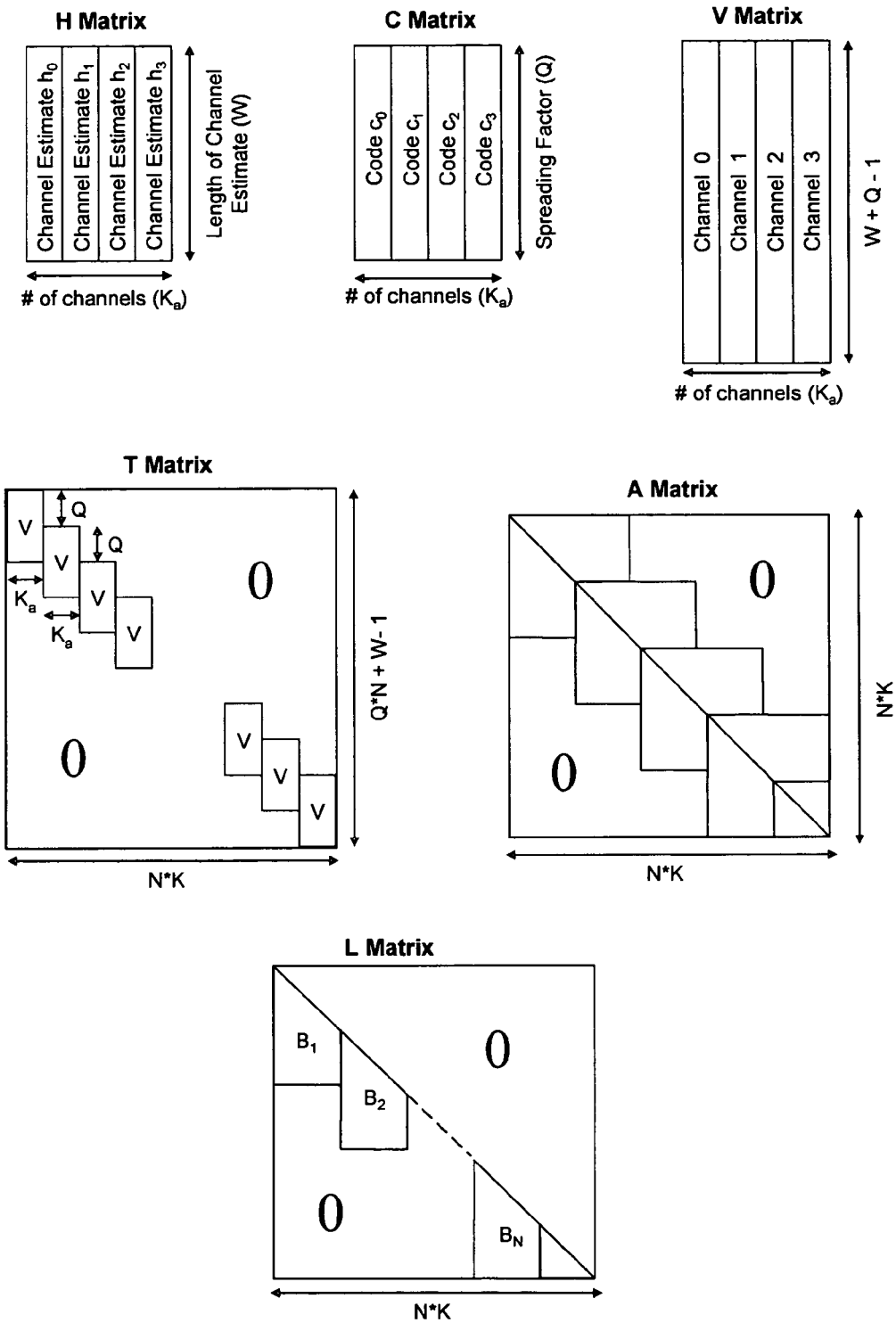
FIG. 3 is a schematic representation of various matrices involved in a joint detection process.

FIG. 3 is a schematic representation of a channel impulse response matrix H, a channelization/scrambling code matrix C, a V matrix, and a T matrix. As shown in the figure, the H matrix has $K_a$ columns and W rows, and the C matrix has $K_a$ columns and Q rows, where W is the length of the channel impulse response, Q is the spreading factor, and $K_a$ is the number of active channels. The V matrix has $K_a$ columns and W+Q−1 rows, and the T matrix has N*Ka columns and N*Q+W−1 rows, where N is the number of data symbols per block. The number of rows of the V matrix depends on the length of the data field, which is N*Q chips for TD-SCDMA, plus the length W of the channel impulse response, which is between 1 and 17 chip periods, minus one (N*Q+W−1).

Using the above-mentioned matrix definitions, the received data r can be expressed in terms of the transmitted data d and the cumulative effect of the channelization/scrambling codes and the channel impulse response, via the matrix T, plus the noise z:

$$r=Td+z$$

Joint detection algorithms can be used to recover the transmitted data d from the received data r. A first algorithm that can be used to solve for the transmitted data d uses a least squares (LS) criterion:

$$\min|T\hat{d}-r|^2 \Rightarrow \hat{d}=(T^H T)^{-1} T^H r,$$

wherein $T^H$ is the transpose conjugate of the T matrix. The least squares algorithm may not perform well for low received signal to noise ratio (SNR) so another algorithm based on a minimum mean squared error (MMSE) criteria can be used:

$$\min E[|\hat{d}-d|^2] \Rightarrow \hat{d}=(T^H T+\sigma^2 I)^{-1} T^H r,$$

where $\sigma^2$ is the variance of noise z. Both the LS and MMSE algorithms can be reduced to the same equation:

$$Ad=y,$$

where $y=T^H r$, and is referred to as a matched filter output, and $A=(T^H T)$ for the LS algorithm or $A=(T^H T+\sigma^2 I)$ for the MMSE algorithm.

Typically solving such equations would involve inverting the A matrix. Due to the properties of the A matrix, Cholesky decomposition can be used to express the A matrix in terms of an upper triangular matrix L and a diagonal matrix D, using the equation $A=L^H DL$, wherein $L^H$ is the transpose conjugate of the L matrix, which can in turn be used to solve the equation Ad=y recursively. For illustration, FIG. 3 also includes a schematic representation of an A matrix and L matrix. The L matrix is composed of N blocks arranged along the diagonal of the matrix, and as shall be discussed further, the L matrix can be approximated by only computing a limited number of the blocks (e.g., block $B_1$ and $B_2$) and setting the remaining blocks equal to the values of the last computed block (e.g., setting blocks $B_3$, $B_4$, ... $B_N$ to the value of $B_2$).

A solution procedure to solve the equation Ad=y can include forward substitution, dot division, and backward substitution to arrive at a value for the transmitted data:

(1) forward substitution: $L^H f=y$
(2) dot division: g=f./D
(3) backward substitution: Ld=g, where f is an intermediate vector solved for in the forward substitution equation and g is an intermediate vector solved for in the dot division equation. Output of the joint detection algorithm can include data for the given user equipment (UE). Data for UEs other than the given UE may be removed so that a final output can include only data for the given UE.

In one embodiment, a joint detector system implementing a joint detection algorithm may include a JDA and a programmable DSP, wherein the programmable DSP performs one or more of the processing operations involved in the joint detection algorithm. A programmable DSP allows for the customization, via software, of the one or more joint detection processing operations that the DSP may perform. The programmable DSP may perform processing operations before the JDA receives the data, may perform intermediate processing operations after the JDA has performed some processing, and/or may perform post-processing after the JDA has completed processing the data. In some embodiments where the DSP performs intermediate processing operations, the JDA may include JDA front-end processing performed before the intermediate processing by the DSP and JDA back-end processing performed after the intermediate processing by the DSP. In one embodiment, an intermediate processing operation performed by the DSP is an active code detection process, as discussed further below. In some embodiments where the DSP performs processing on data prior to sending the data to the JDA, the DSP may perform a channel estimation procedure which can generate H and C matrices. The JDA can be used to solve the linear equation Ad=y, and the DSP may provide received data r, H and C matrices, and noise power $\sigma^2$ to the JDA.

Figure 4:
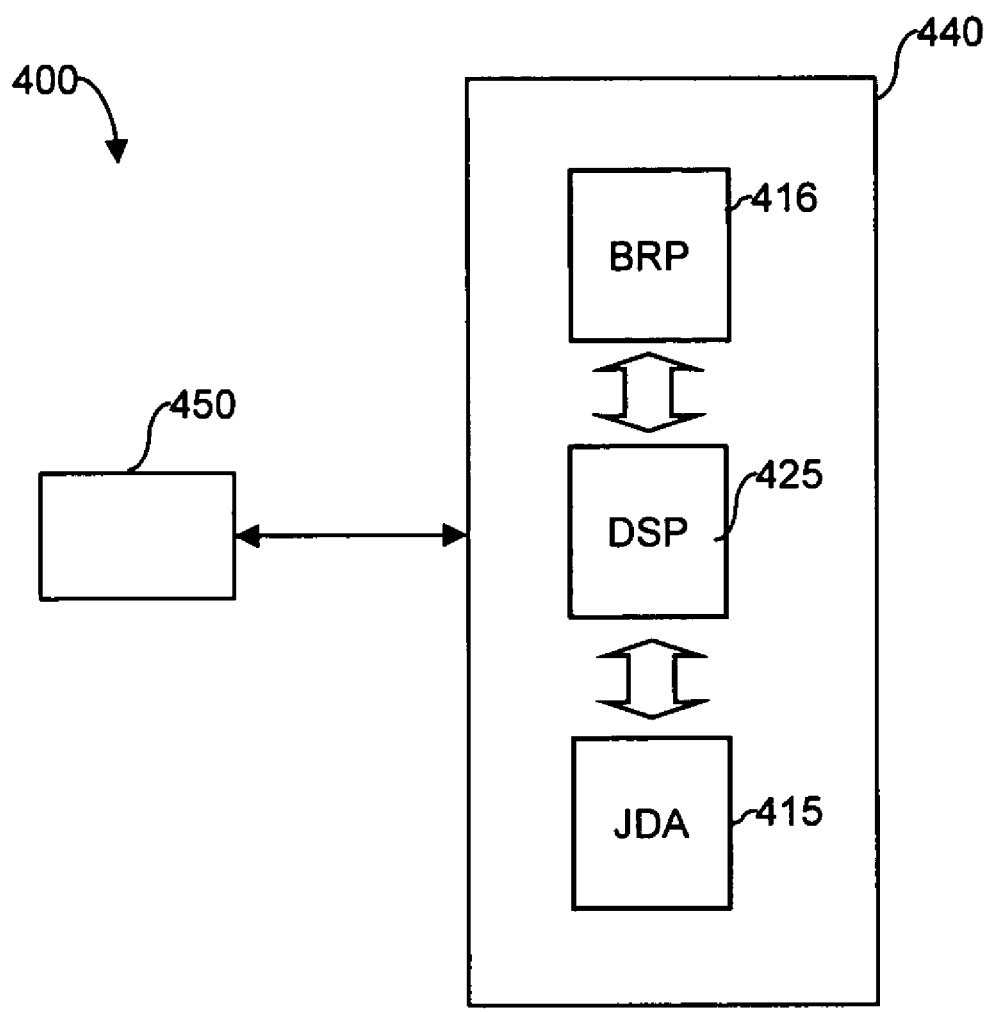
FIG. 4 is a block diagram of a receiver system implementing a joint detector system in accordance with one embodiment.

FIG. 4 is a block diagram of an illustrative receiver system 400 implementing a joint detector system including a JDA 415 and a programmable DSP 425, in accordance with one embodiment. Programmable DSP 425 can perform one or more processing operations involved in a joint detection algorithm. System 400 can include a radio and analog base band (combined unit 450), where the radio component can receive a signal that may be transmitted by a base station and the analog base band component can process the received signal provided by radio component. Digital domain component 440 can in turn process the signal provided by analog base band component.

Digital domain component 440 may include a digital base band component and a co-processor that can facilitate digital domain processing. The digital base band component may include programmable DSP 425 that can perform digital processing of the received signal. The digital base band component may communicate with the co-processor which can facilitate processing of the received signal in the digital domain.

The co-processor can include JDA 415 and bit rate processor (BRP) 416. In one embodiment, JDA 415 may perform one or more processing operations of a joint detection algorithm, and DSP 425 may also perform one or more processing operations of the joint detection algorithm. JDA 415 and DSP 425 may communicate, thereby allowing one or more joint detection processing operations to be performed by DSP 425, with the results of those processing operations being sent to JDA 415 for further processing. Additionally, or alternatively, JDA 415 can also perform one or more processing operations of the joint detection algorithm, with the results of those operations being sent to DSP 425. In this manner, any number of operations in the joint detection algorithm may be performed by DSP 425, and any number of operations in the joint detection algorithm may be performed by JDA 415. The JDA 415 can generate soft decision outputs that may then be converted to the most likely hard decisions by the bit rate processor 416. Bit rate processor 416 can perform channel decoding and error detection on transport channels, de-interleaving to increase channel coding performance, de-rate matching to adjust data rates, de-multiplexing of transport channels, and de-mapping of coded composite transport channels on physical channels.

Figure 5:
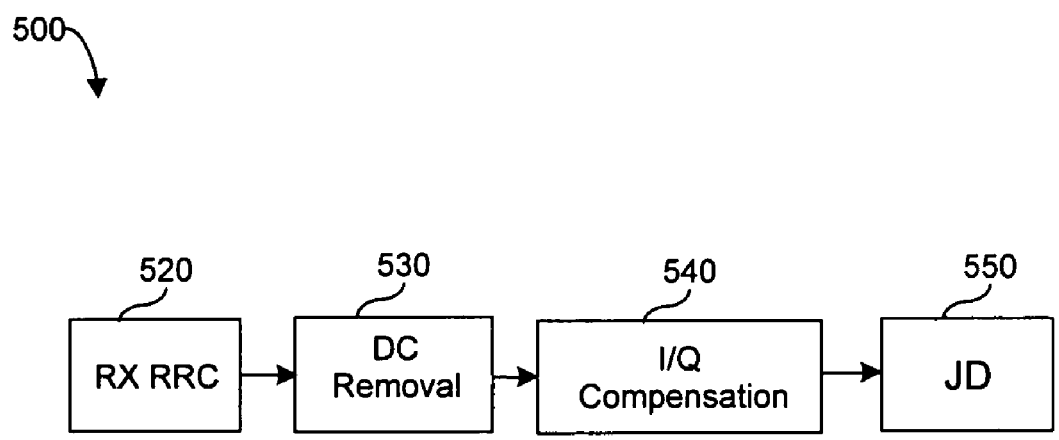
FIG. 5 is a block diagram of an inner receiver chain in accordance with one embodiment.

FIG. 5 is a block diagram of a TD-SCDMA inner receiver chain 500, in accordance with one embodiment. Inner receiver chain 500 may include a receive-side raised root cosine filter 520 which may be implemented in the analog base band (e.g., component 470 of system 400). Raised root cosine filter 520 may provide received signals to one or more pre-processing components, such as DC removal component 530 and I/Q compensation component 540. In one embodiment, DC removal component 530 and I/Q compensation component 540 are implemented by a programmable DSP, such as DSP 425 of system 400. I/Q samples collected from one time slot may be pre-processed by DC removal component 530, which can perform DC offset correction, and by I/Q compensation component 540, which can perform I/Q phase imbalance correction, before the received signal is sent to joint detection system 550. In some embodiments, joint detection system 550 includes a JDA and a programmable DSP that enables customization via software of one or more joint detection processing operations. In one embodiment, the DSP may perform pre-processing operations before sending data to the JDA. Pre-processing performed by the DSP may include channel estimation and/or midamble interference cancellation, as discussed further below.

Figure 6:
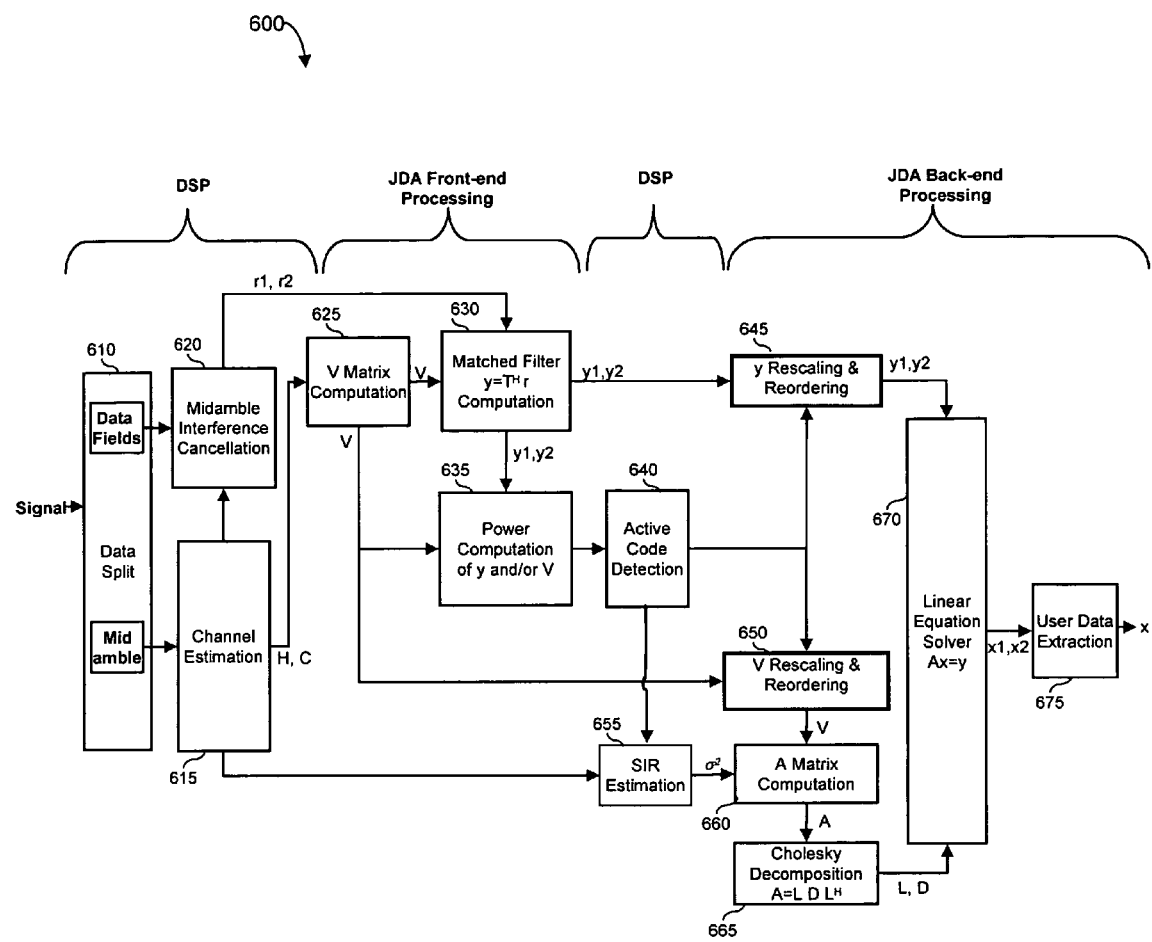
FIG. 6 is a block diagram of a joint detection process in accordance with one embodiment.

FIG. 6 is a block diagram 600 of a joint detection process in accordance with one embodiment. The joint detection process illustrated by block diagram 600 may be performed by a joint detection system, such as the joint detection system 550 of the inner receiver chain of FIG. 5. The operations of the joint detection process may be performed by a JDA, in conjunction with a programmable DSP.

Figure 7:
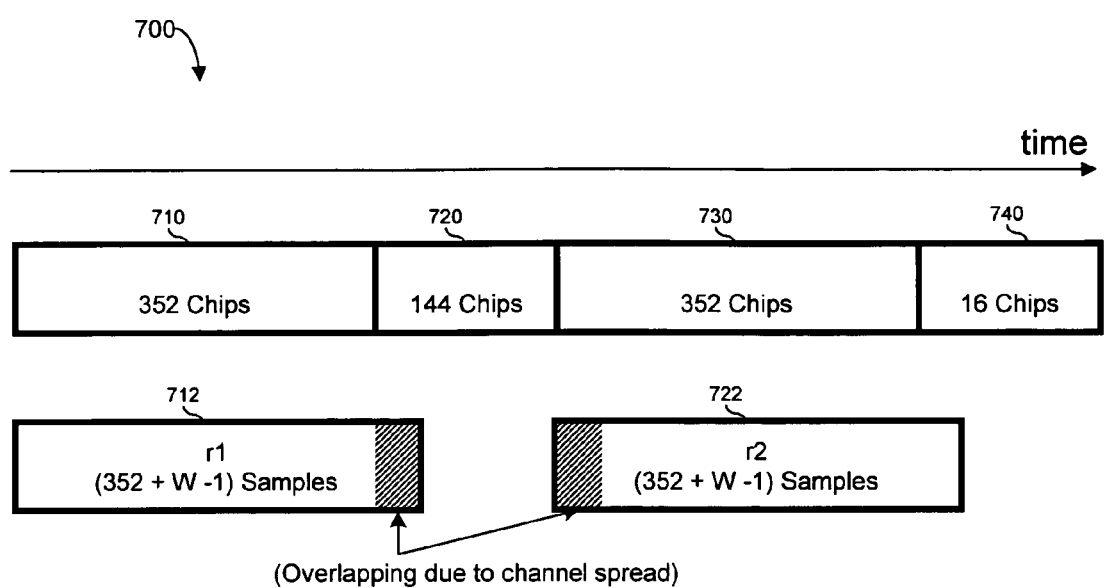
FIG. 7 is a schematic of a slot format of a received signal in accordance with one embodiment.

The joint detection process may begin by receiving a signal that may have undergone DC offset correction, I/Q phase imbalance compensation, and/or any other pre-processing. The received signal may include two data fields, separated by a midamble. FIG. 7 illustrates a time slot format 700 of a received signal including a first data field 710 followed by a midamble field 720, followed by a second data field 730, and then followed by a guard period 740. Due to air propagation channel spread, data in the tail of data field 710 interferes with the midamble 720 and data in the tail of the midamble interferes with the second data field 730, resulting in data field 712 (r1) and data field 722 (r2).

Data split operation 610 of the joint detection process illustrated in FIG. 6 can process the received signal so as to split the signal into two separate signals, the data field (r1 or r2) and the midamble. The joint detection process can be such that data fields r1 and r2 can be processed sequentially, in any desired order, wherein processing of one data field (e.g., r2) may reuse some processing results obtained from the processing of the other data field (e.g., r1), as discussed further below. As such, the description that follows can refer to the processing of data field r1 and/or r2. In some embodiments, the processing of data field r2 is performed before the processing of data field r1. Such an embodiment may be preferable when the second data field includes command instructions, such as synchronization and power control instructions which may be processed during the processing of the data stream of data field r2 and then r1.

Channel estimation operation 615 can process the midamble provided by data split operation 610 and generate channel estimation matrix H and code matrix C, such as the H and C matrices illustrated in FIG. 3. As is known, channel estimation processes can estimate air propagation channels from a base station to the receiver by using a known signal pattern, for example the midamble signal. If a smart antenna is used, each code channel of a TD-SCDMA scheme may be associated with a different propagation channel. A crude estimation of the number of active codes can be made using the result of the channel estimation, but over-estimating the number of active channels is prudent so to not designate an active code as inactive. Ultimately, the active channel detection process of the joint detection can provide a better determination of the active codes. Output of channel estimation operation 615 may include H and C matrices.

Midamble interference cancellation operation 620 can process the data fields outputted by operation 610 by performing a midamble interference cancellation operation that removes the effect of midamble interference on the data fields. The midamble interference cancellation process may involve the use of channel estimates from the channel estimation operation 615. Output of operation 620 may be a data field that has undergone midamble interference cancellation. In one embodiment, data splitting, midamble interference cancellation, and/or channel estimation are performed by the DSP. This allows one or more of these operations to be customized without changing the receiver chip-set.

In one embodiment, the results of pre-processing performed by the DSP are then sent to a JDA for front-end processing. The JDA can receive H and C matrices sent by the DSP (e.g., via an external co-processor interface, as illustrated in the system of FIG. 4) and construct a V matrix in operation 625. The construction of the matrix V may involve using the channel estimation matrix H and code matrix C. The $i^{th}$ column of the V matrix is the convolution of the $i^{th}$ column of the H matrix with the $i^{th}$ column of the C matrix. As described below, in some embodiments, a JDA can implement a shift of the result prior to saving the result into memory.

Additionally, operation 630 of the JDA can perform a matched filter computation and thereby construct the matched filter output $y=T^H r$, where r is r1 and/or r2. The matched filter operation can construct y using the matrix V and the vector r, and the entire $T^H$ matrix does not have to be constructed since many entries of the $T^H$ matrix are zero, as shown in the illustration of FIG. 3. The matched filter operation 630 can receive the V matrix constructed by operation 625. Furthermore, the matched filter operation 630 can also receive the r1 and r2 data fields from the midamble interference cancellation operation 620. As described below, in some embodiments, the JDA can implement a shift of the result prior to saving the result into memory.

The JDA can also calculate the power of the y and V matrix columns in operation 635, which can in turn facilitate active code detection. The calculation of the power of each column of the V matrix may involve an operation wherein the squared magnitudes of the V matrix entries are summed for a given column. The calculation of the power of y can be performed on the vector y1 and the calculation need not necessarily be performed for y2, since y1 may be sufficient for the purposes of active code detection. In some embodiments, a JDA can implement a shift of the resulting power values prior to saving the results into memory.

In one embodiment, active code detection is performed by the DSP. The DSP can receive the y and V matrix (optional) power computation results from the JDA and use the power values to determine the active codes and scaling factors for each channelization code, in operation 640. When the active code detection process is performed in a DSP, customization of the active code detection algorithm is possible. DSP software can be modified as the active code detection process evolves, and the same chip-set can be used to implement the modified active code detection process.

Any suitable algorithm can be used to perform the active code detection. For example, the active code detection procedure may involve determining the codes for which the power of the matched filter output (y) is greater than a threshold level. It should be appreciated that this is just one example of a simple active code detection procedure and any active code detection process may be used. The active code detection process may also determine scaling factors that should be applied to each channelization code. Scaling factors for each channelization code may be represented by mantissa values and exponent values. It should be appreciated that active code detection need not necessarily be performed and the operation may be by-passed in certain circumstances, for example, when using a spreading factor of one, or when a user's equipment already possesses an indication of which codes are active in a given time slot.

Results of the active code detection operation can be used by a SIR estimation operation 655, which may also be performed by the DSP. SIR estimation operation 655 may use both the results of the channel estimation operation 615 and the active code detection operation 640. SIR estimation operation may output the noise power $\sigma^2$. It should be appreciated that in some embodiments, the SIR estimation may be performed without using the results of the active code detection. In such cases, the SIR estimation may be performed by the DSP after the channel estimation and can be sent to the JDA prior to when the JDA performs front-end processing. Alternatively, the SIR estimation may be performed by the DSP, at least in part, while the JDA is performing front-end processing.

In some embodiments, an indication of the active codes and scaling factors as determined by the active code detection process performed by the DSP, and/or noise computed by the DSP are sent to a JDA for back-end processing. The JDA back-end processing may include a y rescaling and reordering operation 645 and a V rescaling and reordering operation 650. These operations may reorder and rescale the y and V matrix columns on the basis of results sent by active code detection operation 640, where the reordering eliminates any columns corresponding to non-active codes. As a result of such a reordering, the JDA back-end processing may use the same matrix indexing irrespective of which codes are active.

The back-end processing performed by the JDA may also include an A matrix computation operation 660 that receives the rescaled and reordered V matrix generated by operation 650 and the noise generated by operation 655 to construct the A matrix by evaluating the matrix operation $T^H T+\sigma^2 I$. The construction of the A matrix does not necessarily involve the construction of the T matrix since the elements of the A matrix may be computed using the V matrix directly, and since many elements of the T matrix are zero. Thus, the computation of only the non-zero elements of the A matrix may be performed, and these non-zero elements of the A matrix can be stored (e.g., known zero elements need not be stored). In some embodiments, a JDA can implement a shift of the resulting A matrix values prior to saving the results into memory.

The JDA back-end processing may also include a Cholesky decomposition operation 655 that can decompose the A matrix into L and D matrices. The Cholesky decomposition may be performed without the computation of all the L matrix elements. The L matrix can be divided into blocks which converge in value, and the number of blocks computed may depend on the degree of accuracy desired. In one implementation, the number of blocks computed for the L matrix is 2. Using a reduced number of blocks for the L matrix results in a reduced number of divisions in the dot division computation, thereby facilitating the implementation of the joint detection algorithm. Thus, the computation of only a subset of the non-zero elements of the L matrix may be performed, and these non-zero elements of the L matrix can be stored (e.g., known zero elements need not be stored).

The JDA back-end processing can further include a linear equation solver operation 670 that solves linear equation Ax=y (e.g., using forward substitution, dot division, and backward substitution, as described previously). Linear equation solver operation 670 can receive data fields from y rescaling and reordering operation 645 and L and D matrices from Cholesky decomposition operation 665. Linear equation solver operation 670 can generate data fields (x1 and x2).

In some embodiments, a JDA can implement a shift of the results of the forward substitution, dot division, and/or backward substitution processes prior to saving the results into memory.

Data fields x1 an x2 can be processed by user extraction operation 675 which can extract the particular UE data using the code(s) which that UE is utilizing: The two data fields x1 and x2 can be generated sequentially by the linear equation solver 670 and the user data extraction block 670 can also combine the two data fields so as to create one unified data field x, which the data extraction operation 670 then can output for processing by other components. For example, post joint detection processing may be performed by the DSP. If codes in addition to the UE codes are desired, for example, for power measurements, other codes may be included in the output.

In some embodiments, a JDA may be implemented in a fixed point implementation, wherein the result of an operation (e.g., in an accumulator) are shifted prior to saving a reduced number of bits, at fixed bit locations of the accumulator, into memory. Such an operation is equivalent to selecting which bits of the accumulator to save to memory without having to shift the contents of the accumulator. The shift value and which fixed bit locations of the accumulator are to be saved to memory may be chosen so as to ensure that the value in the accumulator is adequately represented in memory (e.g., an accurate value without any significant bit clipping).

In one embodiment, the JDA includes a memory component wherein variables are stored as signed N-bit fractions. As such, the numerical values of the stored variables are between −1 and +1, including −1 and excluding +1. Alternatively, variables in the memory of a JDA may be signed N-bit integers, as the techniques presented herein are not limited to only use with fractions. When operations are performed on two or more stored variables in a JDA, the result of the operation (e.g., stored in an accumulator) may not fit the aforementioned variable range for storage in the JDA memory. The shifting techniques presented herein allow for the storage of values using a desired bit-width.

It should be appreciated that many operations within a JDA are multiplications and/or summations, such as, the operation $c_j=\Sigma_i a_i b_i$. A JDA may perform such an operation so as to preserve a high precision during the multiply and accumulate operations (MAC) via the use of an accumulator having a bit-width that is significantly larger than the memory data bit-width to which the final result of the MAC will be saved to. Upon completion of an operation, such as a MAC, a subset of the accumulator bits may be saved to memory. A selection of which accumulator bits shall be saved to memory may involve shifting the contents of the accumulator by a shift value and saving bit values from fixed bit locations of the accumulator to memory.

Figure 8:
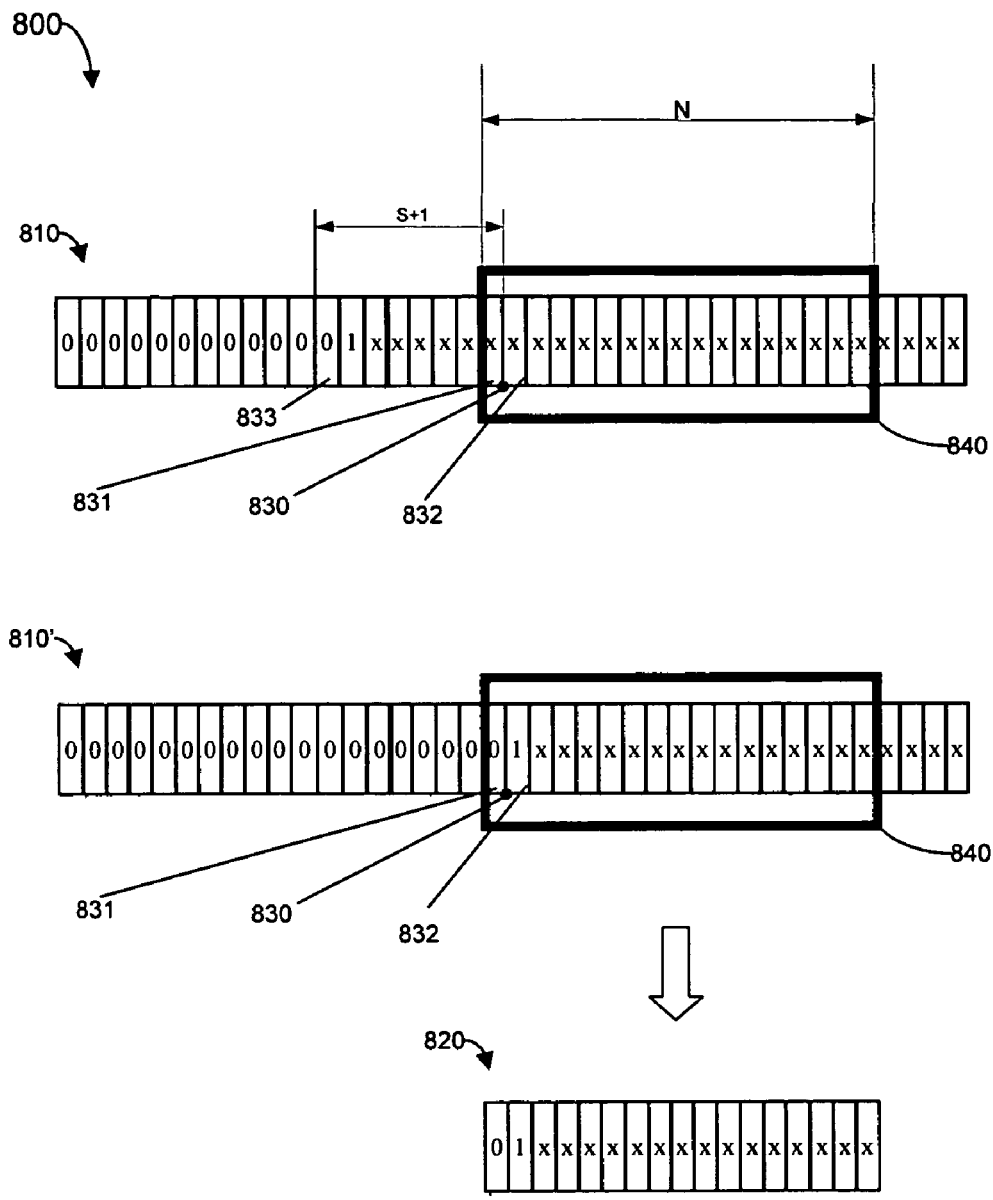
FIG. 8 is a schematic of the contents of an accumulator before and after a shifting process in accordance with one embodiment.

FIG. 8 is a diagram of an accumulator and a subset of bits of the accumulator which are saved to memory after a shift operation in accordance with one embodiment. The bit values illustrated in diagram 800 are merely for illustrative purposes, and the techniques presented are not limited in this respect. An accumulator 810 may include a larger number of bits than will be stored to a data memory storage location 820 after an operation (e.g., a MAC) is complete. The accumulator 810 may include any number of bits, such as 28 bits, which may include a sign bit, and the number of bits N of the result stored to memory may be any number less than the number of bits of the accumulator, for example 11 bits, which may also include a sign bit. It should be appreciated that the aforementioned accumulator and data bit-width values are just examples, and the techniques presented herein are not limited in this respect.

Also, the accumulator size may be selected to be large enough, based on the size of the data being operated on, so as to ensure that there is no substantial loss of precession.

The number of the bits of the accumulator 810 that should be saved to memory may be selected based on the desired memory data bit-width N. Furthermore, the specific location of the fixed bits in the accumulator 810 that should be saved to memory may be selected arbitrarily, since the shift that will be applied to the accumulator contents prior to saving the result to memory may be adjusted accordingly based on the selected fixed bit locations. In the diagram of FIG. 8, the accumulator data bit values that will be saved to memory are the bits values within the rectangle 840.

The data operated on, and the operation performed, may be such that an accumulator radix point 830 is located between two specific bit locations 831 and 832 of the accumulator 810, as may be the case when the data operated on are signed fractions. The accumulator 810 data bits that will be saved to memory, namely bits within the rectangle 840, have been chosen so that the bit location 831 contains the left most bit that will be saved to memory.

After an operation (e.g., a MAC) is complete and the result of the operation is in the accumulator 810, the bit values which should be saved to memory are selected based on a shift applied to the bit contents of the accumulator 810. The diagram of FIG. 8 shows the application of a shift to the contents of the accumulator 810 so as to shift the bit values of the accumulator, as illustrated in the resultant accumulator 810'. Accumulator 810' is the same accumulator as 810, after the bit values in accumulator 810 have been shifted by a shift value S to the right. The shift value is a signed integer and may be determined or set in any suitable manner, as discussed below. A positive shift value S, where S is a positive integer, may be associated with a shift of the accumulator bits to the left. A negative shift value –S, where S is a positive integer, may be associated with a shift of the accumulator contents to the right. It should be appreciated that the sign of the shift value is arbitrary and depends on convention, and, the techniques presented herein are not limited in this respect.

In the illustration of FIG. 8, the shift value is such that the shift operation moves the first sign bit value at bit location 833 into the accumulator bit location 831. Upon completing the shift of the contents of the accumulator, the bit values at the fixed bit locations of the accumulator, as indicated by rectangle 840, are saved to memory. In the illustrative example of FIG. 8, the shift value was selected so that the repeated sign bits of the binary number within the accumulator are not stored within the memory, which is referred to herein as normalization. It should be appreciated that values may be shifted by any amount, as the example presented in FIG. 8 is merely for purposes of illustration. In some embodiments, values stored to memory are signed N-bit fractions, and the shift value applied to the contents of the accumulator is such that the shifted contents to the left of the accumulator radix point only include repeated sign bits (e.g., bits to the left of bit location 833 in accumulator 810).

Figure 9:
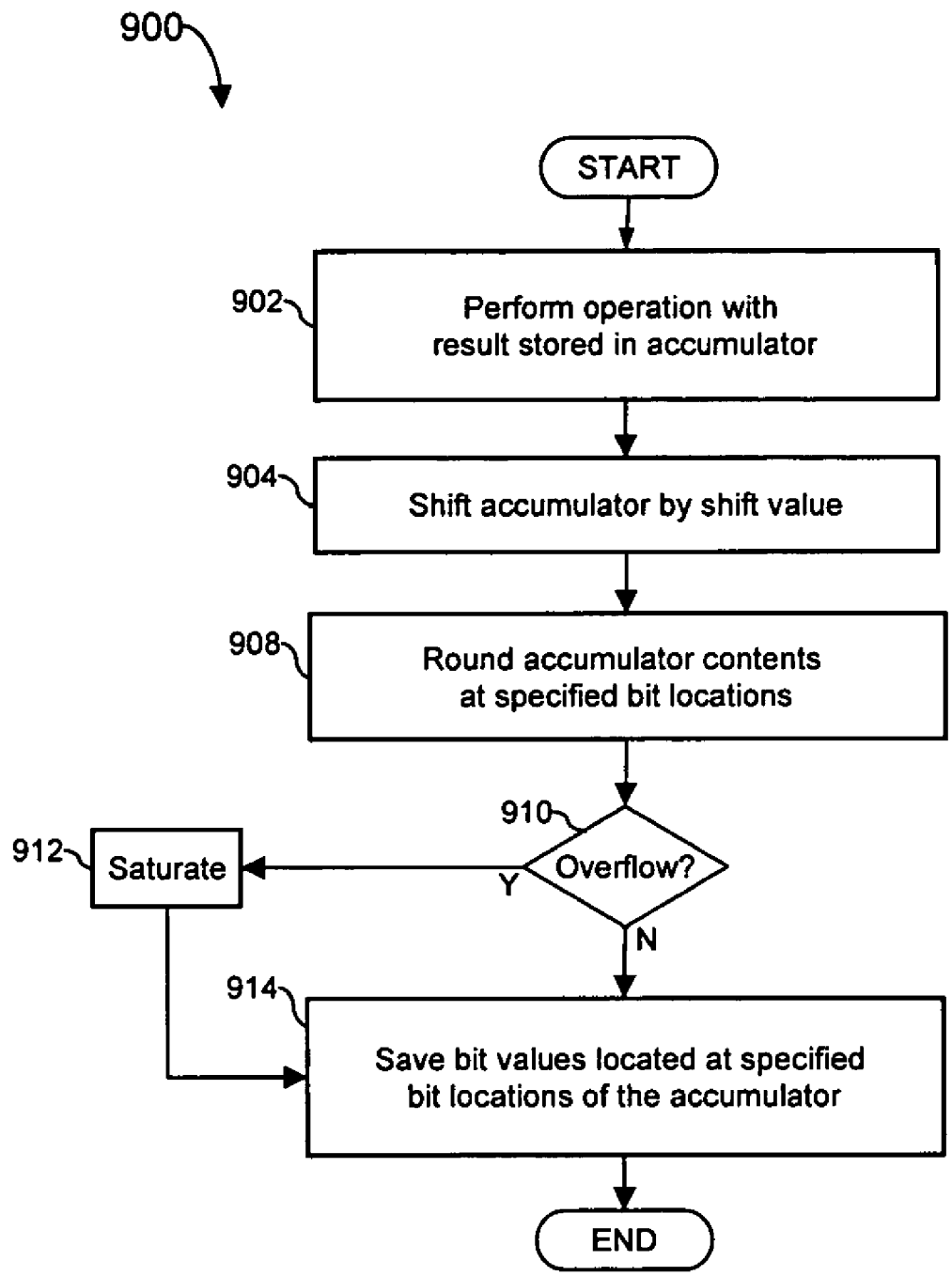
FIG. 9 is a flowchart of a process by which the contents of an accumulator are shifted and a subset of bits of the accumulator are stored to memory in accordance with one embodiment.

FIG. 9 is a flowchart of a process 900 by which the result of an operation stored in an accumulator may be stored to memory. Process 900 may be performed by hardware in a JDA, which in the case of a MAC operation may include a multiply accumulate unit and one or more shifters. In act 902, an operation (e.g., a MAC) is performed with the result stored in an accumulator. Upon completion of the operation, the accumulator contents are shifted by a shift value, in act 904. The shift operation is equivalent to multiplying or dividing the contents of the accumulator by $2^{SHIFT}$, where SHIFT is the shift value. The shifting operation may be performed by an output shifter, and the shift value used may be determined internally by the JDA or may be provided by a system external to the JDA (e.g., a programmable DSP, and may be specified by a user).

In act 908, the accumulator contents may be rounded in anticipation of storing a subset of bits into memory. The rounding may be performed by rounding-up (or down) the last bit of the subset of bits of the accumulator that will be stored to memory. However, it should be appreciated that rounding may be performed in any other suitable way, as the techniques presented herein are not limited in this respect. In act 910, overflow verification may be performed to determine whether rounding results in an overflow, as is well known to those skilled in the art. If a determination is made that overflow occurred, the contents of the accumulator that will be saved to memory are saturated (act 912). Saturation involves setting the value to be stored to memory to the largest positive or the smallest negative N-bit number.

If a determination was made that no overflow occurred (in act 910), or overflow occurred and the value was then saturated accordingly, the process proceeds with act 914 where N contiguous bits at a specified fixed location in the accumulator are saved to memory, where N is less than the total number of accumulator bits. The number N of bits saved to memory and the fixed location of the accumulator bits that should be saved to memory may be specified by a hardware designer upon the design of the JDA. Process 900 may then terminate.

In some embodiments, different variables may have different associated shift values. In some embodiments, each element of a vector or matrix stored in memory is assigned the same shift value. In other embodiments, different columns or rows of a matrix are assigned different shift values. Allowing different shift values to be used for different columns or rows of a matrix can allow accuracy to be improved by selecting the shift value for each column or row based on a tailoring of the shifts to the values in each column or row of the matrix.

It should be appreciated that an addition operation performed by a JDA may involve two or more stored variables having been potentially stored using different shifts. It should be understood that stored variables associated with different shift values may be viewed as the storage of mantissa values having different exponents. In such operations, the JDA may ensure that the shift is the same for all of the variables being added prior to performing the addition. For example, when performing an operation such as $c_j=d_j+\Sigma_i\ a_ib_i$, a JDA may determine whether one or more of the vector elements have been shifted prior to storage in memory. If one or more of these vectors have been shifted, then the JDA may ensure that all the vectors have the same shift value prior to performing the addition. For example, if vector a has undergone a shift by a shift value A_SHIFT prior to being saved into memory, vector b has undergone a shift by a shift value B_SHIFT prior to being saved into memory, and vector d has undergone a shift by a shift value D_SHIFT prior to being saved into memory, then the JDA may shift the vector d retrieved from memory by A_SHIFT+B_SHIFT−D_SHIFT prior to adding the d vector elements to the summation result $\Sigma_i\ a_ib_i$. Such an operation can be represented mathematically as $(d_j<<A\_SHIFT+B\_SHIFT-D\_SHIFT)+\Sigma_i\ a_ib_i$, where the operator "<<" represents a shifting operating performed on $d_j$. The result of the operation may then also be shifted prior to storage in a memory location.

Figure 10:
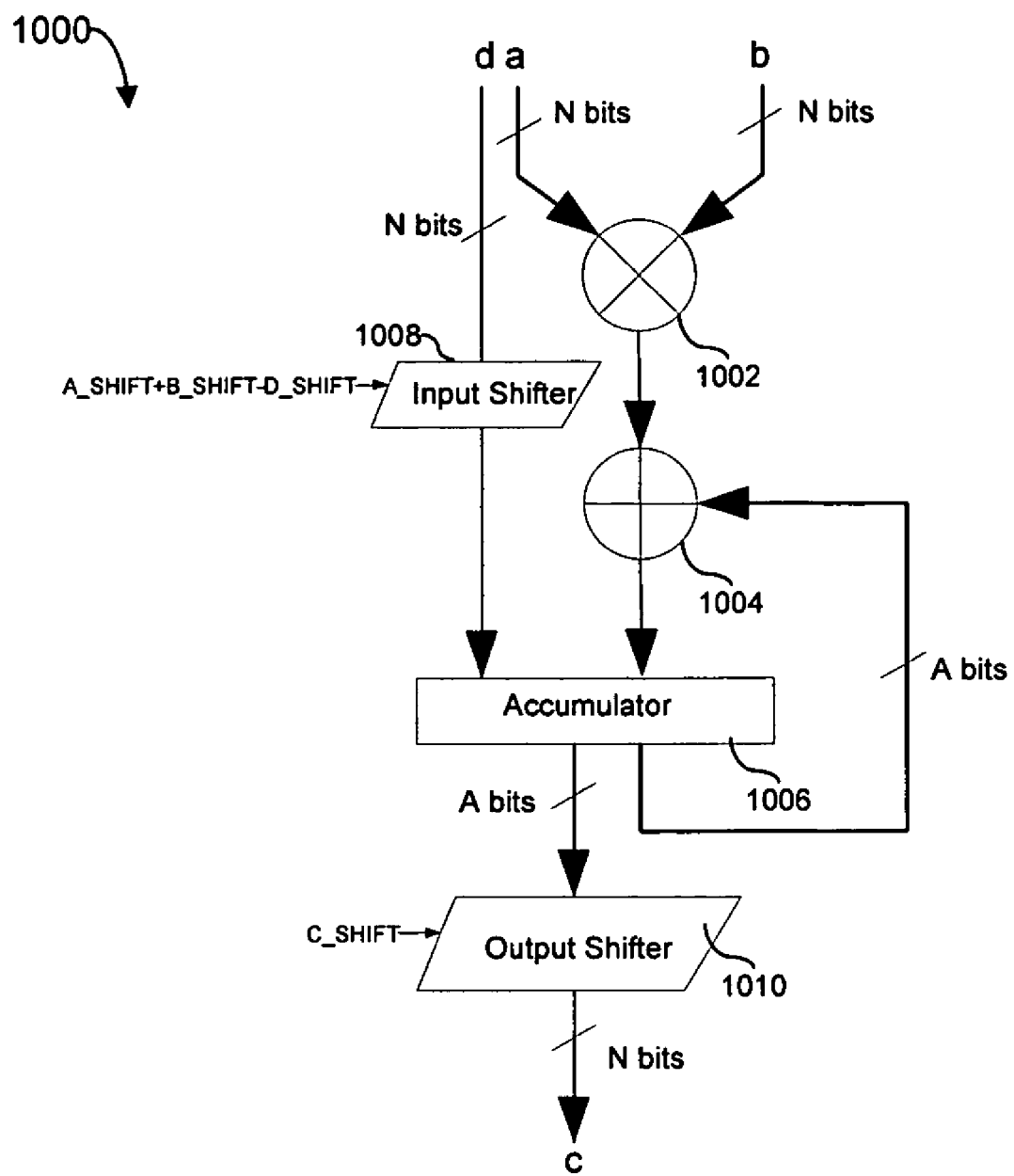
FIG. 10 is a block diagram of hardware architecture that can implement a shifting process in accordance with one embodiment.

FIG. 10 is a block diagram of hardware architecture 1000 in a JDA that can implement a shifting process for an operation involving the addition of a variable d to the result of a summation $\Sigma_i\ a_ib_i$, as described above. In one embodiment, the number of bits N used to store variables a, b, and d is 11, and the number of accumulator bits is 28, although other data bit-widths are possible, and the techniques described herein are not limited in this respect. Hardware 1000 can include an input shifter 1008 for shifting the d value prior to loading into an accumulator 1006. The shift value used by input shifter 1008 may be A_SHIFT+B_SHIFT−D_SHIFT, if vector a has undergone a shift by a shift value A_SHIFT prior to being saved into memory, vector b has undergone a shift by a shift value B_SHIFT prior to being saved into memory, and vector d has undergone a shift by a shift value D_SHIFT prior to being saved into memory.

Hardware 1000 can also include a multiplier 1002 for multiplying the $a_i$ and $b_i$ input values, and an adder 1004 for adding the contents of the accumulator 1006 with the results of the multiplication of $a_i$ and $b_i$ provided by multiplier 1002. Accumulator 1006 can comprise a number of bits A, which may be greater than the number of bits N of the input data. Upon completion of the multiply and accumulate operation, the value in the accumulator 1006 may be shifted by a shift value C_SHIFT by output shifter 1010, and a subset of the accumulator bits may be saved to memory. The subset of bits of the accumulator may include N bits at fixed locations in the accumulator, as described previously. The shift value C_SHIFT may be selected so that the significant bits of the resultant value in the accumulator are saved to memory. By reducing the number of bits used for storage of intermediate values computed during the joint detection process, a JDA may possess a desirable speed, memory area, and/or power consumption.

In some embodiments, one or more shift values used in a JDA are set by a system external to a JDA (e.g., by a programmable DSP). An external system can include a programmable DSP that allows a designer to program software that determines shift values for one or more variables stored by the JDA. Alternatively, or additionally, a designer sets a fixed shift value (e.g., via the programmable DSP), which is then provided to the JDA. The determination of shift values by the DSP may involve the use of results from processing performed in the front-end processing of a JDA. For example, shift values for one or more variables stored by the JDA may be determined by the DSP based on results of an active code detection procedure that may be performed by the DSP. Such a procedure may be desirable since the selection of shift values for back-end operations of a JDA may depend on the number of additions in summation operations, which may in turn be related to the number of active codes. Shift values therefore may be determined by the DSP based at least partially on the results of the active code detection procedure and the shifts may then be sent to the JDA.

In some embodiments, one or more shift values used by the JDA are determined internally by the JDA. Internal determination by the JDA of one or more shift values to be used by the JDA may involve analysis of results of the data to be stored in memory. In the case of an A matrix, it may be difficult to compute a maximum possible output shift in software because the V matrix is stored internally in the JDA, and therefore it may be desirable to have the JDA determine shift values for the A matrix. In some embodiments, a maximum possible output shift for the A matrix can be computed by the JDA internally. If the output shift for the A matrix is computed by the JDA internally, the maximum possible output shift can be determined based on the largest element in the A matrix. The largest element in the A matrix is along the diagonal since the elements on the diagonal represent the autocorrelation for each code channel (plus noise) and the channelization codes, and the autocorrelation for each code channel is greater than the cross-correlation to any other code channel. To determine the maximum possible output shift for the A matrix, each element of the diagonal of the A matrix may be computed and the maximum possible shift value of the largest element may be used as the maximum possible output shift for all A matrix elements. It should be appreciated that the automatic internal determination of shift values may be performed using only a small number of cycles as compared to the total number of cycles used to perform the entire joint detection process.

The storage of other variables in the JDA may also benefit from the internal determination of shift values by the JDA. For example, the results of the dot division process may also benefit from the internal determination of shift values that should be applied to the result prior to storing the result in memory. In the case of a dot division, such as the f./D operation of the linear equation solver operation, as described previously, the operation includes a multiplication of a fraction with the inverse of a diagonal D matrix. Since the elements of D are positive fractions, there exists a possibility that the dot division result is not a fraction. An internally derived shift for the inverse diagonal elements of the D matrix (i.e., $1/d_{ii}$) can be used to ensure that the result of the dot division is also a fraction. In some embodiments, a single shift value for all elements of the matrix is used, which can minimize computational complexity and memory area. In such embodiments, the single shift value may be determined by determining a maximum possible shift value of the largest element of the matrix, and then using that maximum possible shift value for all elements of the matrix.

Division for the D matrix may be executed for each element of the D matrix in multiple parts. First, each diagonal element of the D matrix may be normalized via a shifting process that shifts each element by a shift value and thereby determines a mantissa and exponent for each diagonal element, thereby eliminating repeated sign bits, as is known in the art. The shift values applied to all elements may be the same, to reduce computational complexity, or may be different, as the techniques presented herein are not limited in this respect. The normalized values of the D matrix elements $d_{ii}$, referred to as normalized($d_{ii}$), are less than 1 and greater than or equal to 0.5. Therefore, each value 0.5/normalized($d_{ii}$) is a fractional number greater than 0.5 and less than or equal to 1. The normalized values 0.5/normalized($d_{ii}$) may be computed in an intermediate divider having a larger number of bits (e.g., 21 bits) and then a reduced number of those bits may be saved in memory in the form of a mantissa (e.g., as an 11 bit value) and an exponent (e.g., a 5 bit value). Furthermore, the maximum exponent for the values 0.5/normalized($d_{ii}$) may be determined and used as a shift value prior to storing the result of the dot division operation, g=f/.D, where it should be understood that the maximum exponent can be used as a shift value for all of the elements of the g vector.

In some embodiments, a designer may select whether the JDA uses a shift value for a given variable such that the shift is determined internally by the JDA or set by a system external to the JDA (e.g., by the programmable DSP). A designer may be able to set a bit variable, for example via the programmable DSP that communicates with the JDA, wherein the bit variable indicates whether the JDA should use a shift value for a given variable that is determined internally (e.g., as described above for the A and 1./D matrices) by a JDA or set by a system external to a JDA (e.g., as programmed into a DSP by a designer). This allows a designer to select which variables should be stored using shifts determined internally and which variables should be stored using shifts as determined or set by an external source (e.g., a programmable DSP). This approach offers flexibility by enabling a designer to select which bits are significant via externally determined shift values for some variables (e.g., shifts values programmed by a designer), while at the same time allowing the JDA to internally determine shift values for other variables using the results of intermediate processing. The shift values set by a system external to the JDA may involve a calculation of the shift values using intermediate results provided to the external system, or may be fixed shift values that may be provided by a designer.

It should be appreciated that one or more techniques for using, determining, and/or setting shifts for a fixed point implementation of a JDA may be used alone or in combination with other techniques presented herein. Shifts may be used in a JDA that communicates with a programmable DSP to perform one or more processing operations, such as one or more intermediate processing operations, but the technique of shifting variables in a JDA may also be used by JDAs that do not possess all the features presented herein (e.g., JDAs that do not necessarily use a DSP for intermediate processing operations).

In some embodiments, a joint detection algorithm may include an operation of pre-scaling one or more propagation channel estimates (e.g., one or more columns of the H matrix of FIG. 3) prior to sending the channel estimates to a JDA. A pre-scaling operation may be included in a channel estimation operation, and performed once initial channel estimation is complete and before outputting of the channel estimates. Such pre-scaling may be performed in a programmable DSP that may also perform the initial channel estimate process. Pre-scaling of one or more propagation channel estimates prior to those channel estimates being sent to a JDA may allow for improved accuracy in a fixed-point implementation of a JDA.

Figure 11:
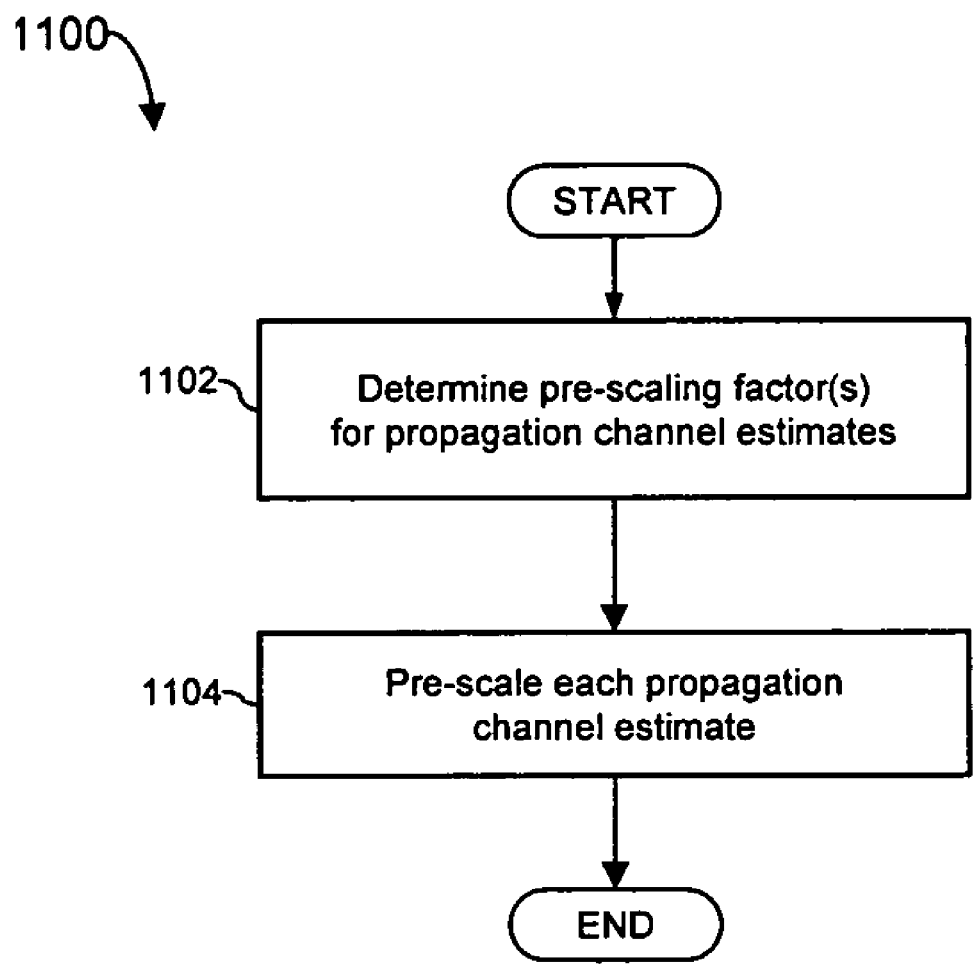
FIG. 11 is a flowchart of a pre-scaling procedure for propagation channel estimates in accordance with one embodiment.

FIG. 11 illustrates a flowchart 1100 of a pre-scaling procedure for the propagation channel estimates. The process can begin with act 1102, wherein one or more pre-scaling factors are determined. The pre-scaling factors will be applied to propagation channel estimates that may have been determined by an initial channel estimation procedure. The pre-scaling factors for each propagation channel may be different, but it should be appreciated that the technique is not limited in this respect. The determination of the one or more pre-scaling factors may be performed in any suitable manner.

Pre-scaling factors for the propagation channel estimates may be selected based at least partially on the maximum element of the propagation channel estimate and/or the power of the propagation channel estimate. Pre-scaling factors may be selected to achieve a variety of objectives, including, but not limited to: (1) scaling the propagation channel estimates so that after pre-scaling the propagation channel estimates have the same exponent for their maximum absolute value elements, (2) scaling the propagation channel estimates so that after pre-scaling the propagation channel estimates have substantially the same maximum absolute value elements (e.g., same exponent and absolute value of mantissa for their maximum absolute value elements), or (3) scaling the propagation channel estimates so that after pre-scaling the propagation channel estimates have substantially the same power.

In one embodiment, the pre-scaling factors may be selected so as to ensure that, upon pre-scaling, the exponents of the maximum absolute value element of each channel estimate are the same. When channel estimates comprise complex numbers entries, the maximum absolute value element can be selected to be the maximum value of the set including the absolute value of the real components and absolute value of the imaginary components of the entries. In this context, a complex number entry is formed of two real number elements, namely the real and imaginary components of the complex number. If the initial propagation channel estimates are given by $$h_1 = [h_1(0), h_1(1), \ldots, h_1(w-1)]$$
$$h_2 = [h_2(0), h_2(1), \ldots, h_2(w-1)]$$
$$\vdots$$
$$h_{ka} = [h_{ka}(0), h_{ka}(1), \ldots, h_{ka}(w-1)]$$

where $h_1, h_2, \ldots, h_{ka}$, are the initial propagation channel estimates (columns of the H matrix) and each initial propagation channel estimate is a vector having w−1 complex entries. Each complex entry $h_i(j)$ is formed by a real element real($h_i(j)$) and imaginary element imag($h_i(j)$). Thus, as referred to herein, the maximum absolute value element (also referred to as the maximum absolute value of the plurality of values that form an initial propagation channel estimate) of a given propagation channel estimate hi may be represented as the maximum of the set given by {abs(real($h_i(j)$)), abs(imag($h_i(j)$)), j=0, \ldots, w−1}.

In another embodiment, the maximum absolute value element of a given propagation channel estimate (e.g., a given column of the H matrix) is determined and the pre-scaling factor for the given channel may be set to the inverse of the maximum absolute value element, thereby ensuring that after pre-scaling, the elements of the given propagation channel are less than or equal to unity (e.g., fractions). The pre-scaling factors for each propagation channel estimate may be represented using a separate mantissa and exponent.

In another embodiment, the power of each propagation channel estimate (e.g., the norm squared of each column of the H matrix) is determined and each channel may be scaled with a pre-scaling factor so as to have the substantially the same power after scaling. The pre-scaling factors for each propagation channel estimate may thus be selected to be the inverse of the power of each propagation channel estimate.

In act 1104, each propagation channel estimate is pre-scaled using the pre-scaling factors determined in act 1102. Pre-scaled propagation channel estimates and corresponding pre-scaling factors may then be provided to a JDA.

Figure 12:
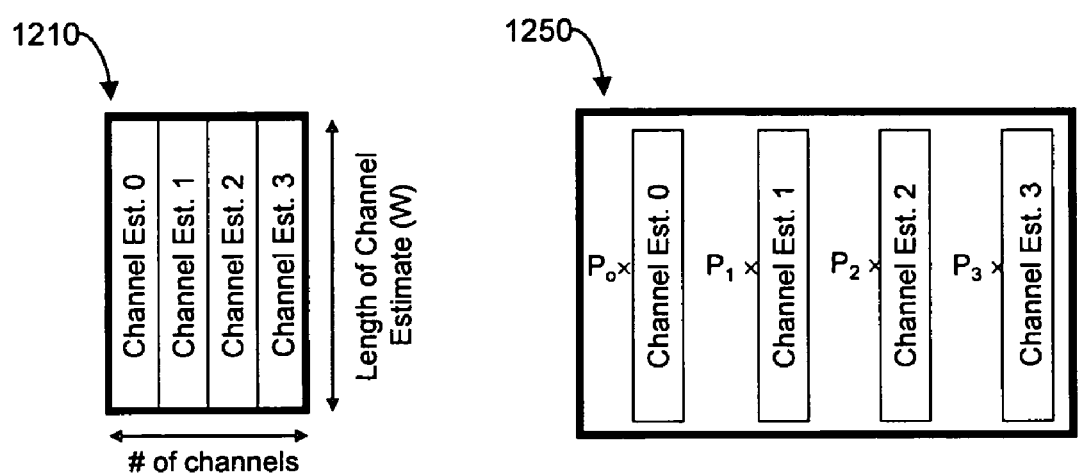
FIG. 12 is a schematic representation of channel estimate pre-scaling in accordance with one embodiment.

FIG. 12 shows an illustrative embodiment wherein the initial propagation channel estimates are pre-scaled using a pre-scaling factor for each propagation channel in accordance with one embodiment. The initial channel estimates may be represented by columns in the H matrix, as illustrated in the H matrix 1210 which includes one column for each channel, and wherein the length of each column of the H matrix is W. Therefore, each column of the H matrix includes W entries (e.g., complex numbers). FIG. 12 illustrates the pre-scaling of each initial propagation channel estimate (each column of the H matrix) by a pre-scaling factor $P_i$, so as to construct a pre-scaled H matrix 1250. Each pre-scaling factor may be determined in any suitable manner, for example, as described using processes such as those described for act 1102 of the method illustrated in the flowchart of FIG. 11.

It should be appreciated that the technique of pre-scaling may be used alone or in combination with other techniques presented herein. Pre-scaling may be used in a JDA that communicates with a programmable DSP to perform one or more processing operations, such as one or more intermediate processing operations, but the technique of pre-scaling may also be used in other types of JDAs.

The effect of pre-scaling factors may be accounted for during the joint detection process, or at the end of the joint detection process, once the user data has been extracted. In some embodiments, all factors used to scale or shift intermediate results produced during the joint detection process may be accounted for at the end of the joint detection process. Such factors may include pre-scaling factors, scaling factors as dictated by active code detection, and shift values used for JDA memory storage. For example, if the T matrix has been scaled, the influence of those scaling factors (e.g., from active code detection and/or from pre-scaling) may be removed from the final output. Additionally, or alternatively, any shifts performed on intermediate results produced during the joint detection process can be accounted for by shifting the final output by the negative of the net shift value.

Figure 13:
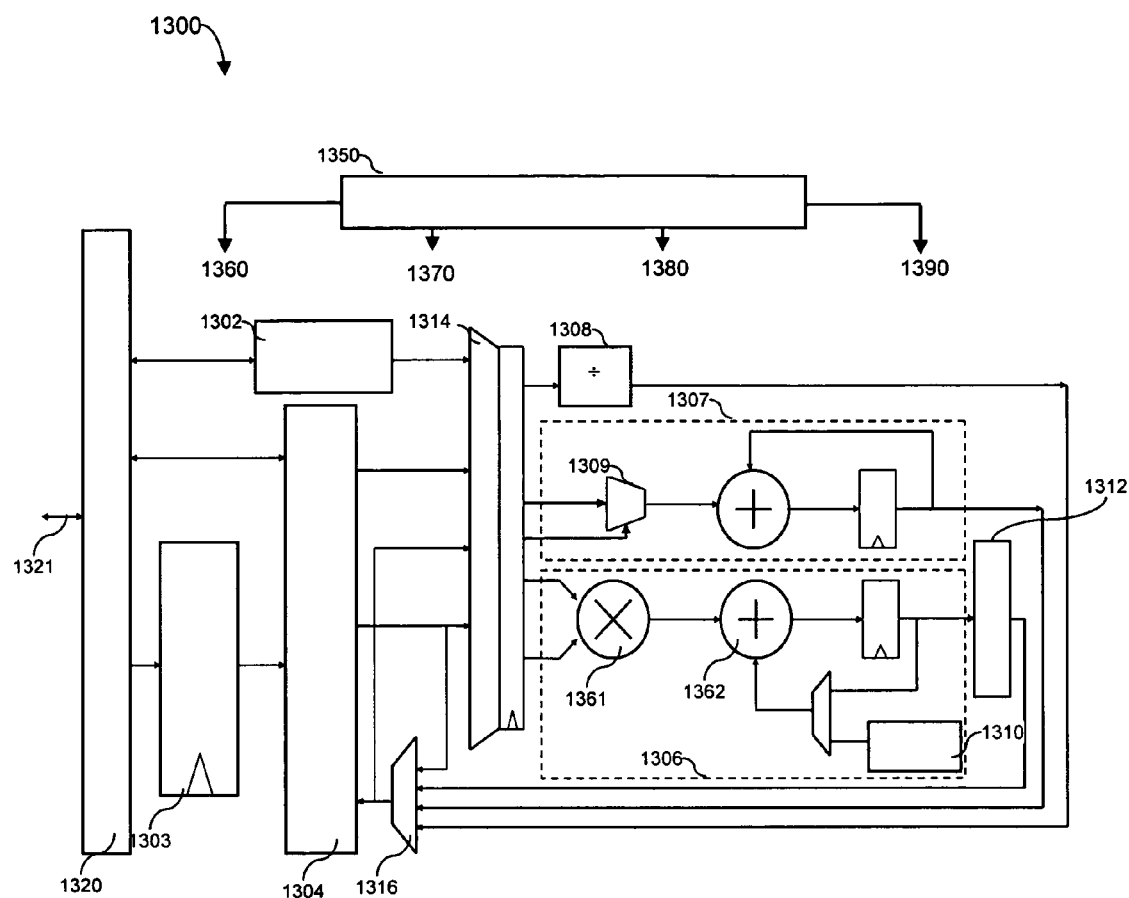
FIG. 13 is a block diagram of a joint detector accelerator architecture in accordance with one embodiment.

One or more of the techniques described herein may be implemented using any suitable hardware architecture, as the techniques are not limited in this respect. FIG. 13 is a block diagram 1300 of a JDA architecture in accordance with one embodiment. The JDA architecture of FIG. 13 includes a communication bus interface 1320 that allows the JDA to communicate with external components (e.g., programmable DSP) via a communication bus 1321. The JDA may include a finite state machine 1350 that can control a plurality of hardware blocks so as to execute a joint detection algorithm, such as the JDA algorithm illustrated in the block diagram of FIG. 6. The JDA hardware blocks may include a data address generator 1303, a register 1302, a joint detection memory 1304, a first multiply accumulate unit 1306 (e.g., a complex number multiply accumulate unit), a second multiply and accumulate unit 1307 (e.g., a complex number multiply accumulate unit), and a divider unit 1308. Register 1302 can store configuration and status information, and joint detection memory 1304 can store data values and parameters used in the joint detection processing algorithm. An input multiplexer 1314 may be included in the architecture and configured to direct input data to the first multiply accumulate unit 1306, the second multiply and accumulate unit 1307, or the divider unit 1308. An output multiplexer 1316 may be configured to direct the results of executed operations back to the joint detector memory 1304.

As illustrated in the architecture of FIG. 13, the JDA may include multiple data paths that can perform different types of operations. The JDA architecture illustrated in the block diagram of FIG. 13 includes three data paths comprising a primary data path that includes a complex multiply and accumulate unit 1306, a secondary data path that includes a simplified version of a complex multiply and accumulate unit 1307, and a divide unit 1308 data path.

The primary data path including multiply and accumulate unit 1306 can perform operations such as $\Sigma_i\ a_i b_i + d_j$. The illustrated primary data path includes an input shifter 1310 and an output shifter 1312 which can multiply or divide values by powers of two (i.e., multiply by $2^{SHIFT}$). Input shifter 1310 may be used to shift the bits of data input value $d_j$ that is to be added to the accumulator, and output shifter 1312 may be used to shift the bits of a resultant value in the accumulator before a subset of those bits (e.g., at fixed bit locations in the accumulator) are stored in joint detector memory 1304. In some embodiments, the primary data path may be used to execute multiplication and accumulation operations other than the computation of the V matrix. It should be appreciated that although the multiply and accumulate unit 1306 includes multiplier 1361 and adder 1362, a complex multiply and accumulate unit 1306 may include four multipliers and two adders for computing the real and imaginary parts of the multiplication of two complex numbers, as is known to those skilled in the art.

The secondary data path including a simplified multiply and accumulate unit 1307 can perform operations such as $\Sigma_i\ a_i b_i$ where $b_i$ is either +1, −1, +j, or −j. Such an operation may be performed during the computation of the V matrix, which may involve the convolution of the H matrix and C matrix columns. Since the code matrix C may be restricted to include elements belonging to the set {+1,−1,+j,−j}, the secondary data path may be used to compute the V matrix elements. The secondary data path may be configured to more optimally perform the multiplication of $a_i b_i$ via the use of one or more multiplexers 1309 that can select the real or imaginary component of input value $a_i$ on the basis of whether $b_i$ is +1, −1, +j, or −j. The accumulation operation performed by the secondary data path does not necessarily include the addition of a $d_j$ value to the summation of $a_i b_i$, nor an accompanying input shift of $d_j$. It should be appreciated that an output shifter that operates on the result of the accumulation may be included in the secondary data path, so as to shift the output. In some embodiments, the secondary data path may be used to execute the computation of the V matrix.

The division data path includes divide unit 1308 and may be used to compute $1/d_{ii}$ operations during the Cholesky decomposition process. The division data path may be used to perform the normalized division process wherein each diagonal element of the D matrix may be normalized via a shifting process that shifts each element by a shift value, thereby eliminating repeated sign bits, as is known in the art. The shift values applied to all elements may be the same, to reduce computational complexity, or may be different, as the techniques presented herein are not limited in this respect. Values $0.5/\text{normalized}(d_{ii})$ may be computed in an intermediate divider having a larger number of bits (e.g., 20 bits) and then a reduced number of those bits may be saved in the JDA memory 1304 in the form of a mantissa (e.g., as an 11 bit value) and an exponent (e.g., a 5 bit value). It should be understood that the storage of a mantissa and exponent for the inverse elements of the D matrix does necessarily require a specific memory, as the mantissa can be stored in place of a real part of a complex number and the exponent can be stored in place of an imaginary part of a complex number.

Finite stage machine 1350 may control the operation of hardware blocks according to multiple pipelined stages including an addressing generation stage 1360, a data fetch stage 1370, an execution stage 1380, and a data write stage 1390. The addressing stage 1360 may be associated with the control of data address generator 1303. The data fetch stage 1370 may be associated with the control of the joint detection memory 1304. The execution state 1380 may be associated with the control of the primary data path, secondary data path, or divide unit data path. The data write stage 1390 may be associated with the writing of the result from the execution stage to the joint detection memory 1304. In one embodiment, except for the initial memory access at the start of each joint detection task computation, the memory access, either read access or write access, occurs on each clock cycle.

Figure 14:
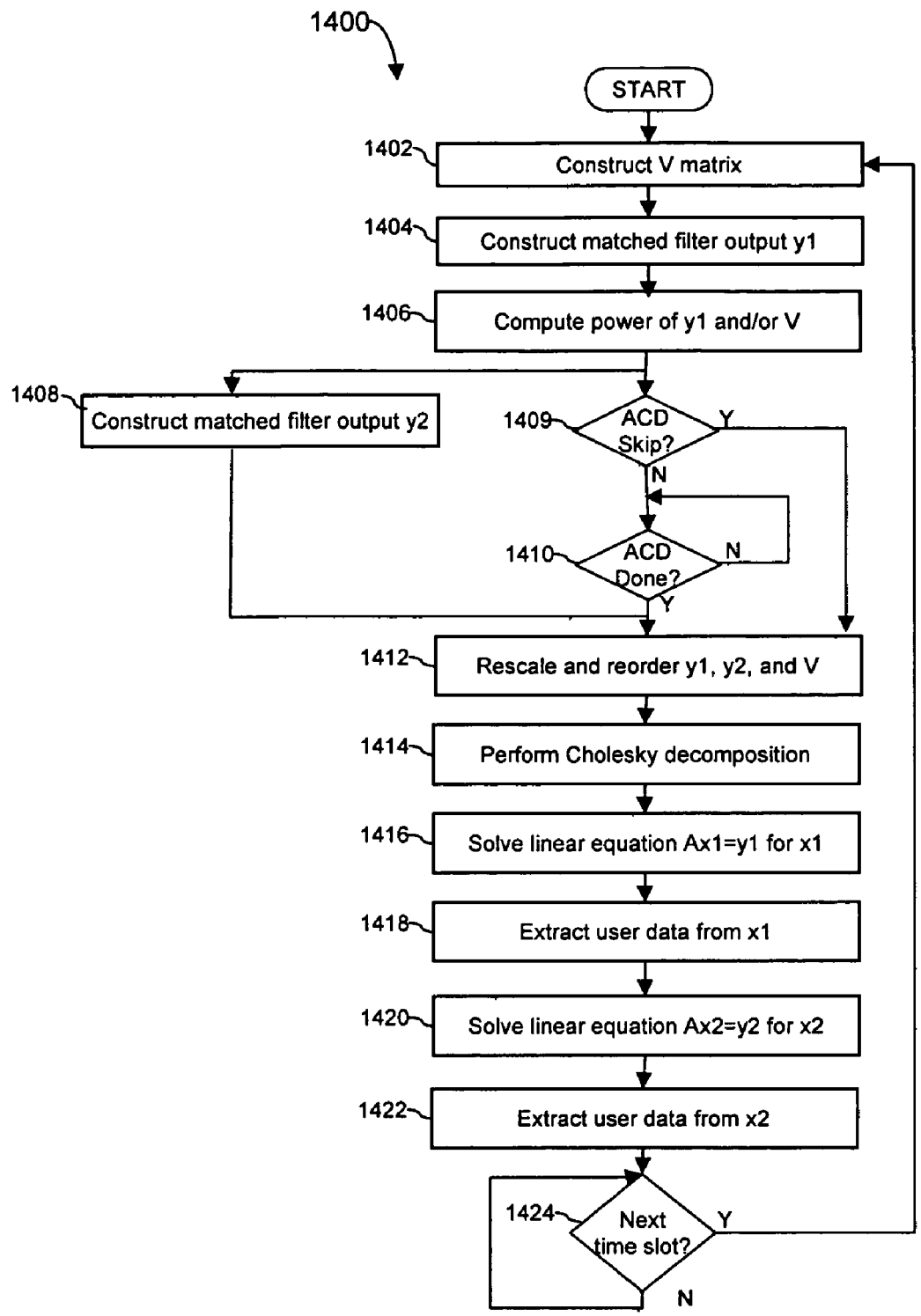
FIG. 14 is a flow chart of a process that may be performed by a finite state machine of a joint detector in accordance with one embodiment.

JDA processing operations, such as those illustrated in the block diagram of FIG. 6, may be performed by the architecture of FIG. 13 under the control of the finite state machine 1350. FIG. 14 illustrates a flow chart 1400 of a process that may be implemented by the finite state machine 1350 to control the hardware blocks of the JDA architecture and perform one or more tasks of the joint detection process. The finite state machine may begin with the construction of the V matrix (act 1402), wherein the finite state machine may control the multiple pipelined stages described previously so as to compute the V matrix elements. The finite state machine may proceed with the construction of a first matched filter output (e.g., y1), wherein the finite state machine may similarly control the multiple pipelined stages so as to compute the matched filter output (act 1404). The finite state machine may proceed with the computation of the power of the V matrix and/or the previously computed matched filter output, where the power of only one matched filter output need be computed in some embodiments, wherein the finite state machine may similarly control the multiple pipelined stages so as to compute the power value (act 1406).

The finite state machine may then proceed with the construction of the second matched filter output (e.g., y2), wherein the finite state machine may similarly control the multiple pipelined stages so as to compute the matched filter output y2 (act 1408). The finite state machine may also proceed to control the execution of acts related to active code detection, which may be performed simultaneously with other acts, such as the construction of the matched filter output y2.

In some embodiments, the acts associated with active detection may include a determination of whether active code detection is desired. An indication of whether active code detection is desired may be provided by a designer. The indication may include setting a parameter to specify whether active code detection should be performed or skipped. The parameter setting may be provided to the JDA via any suitable means, as the embodiments are not limited in this respect. The parameter setting indicating whether active code detection should be skipped may be provided from the DSP coupled to the JDA, and the designer may in turn provide the parameter to the DSP. The finite state machine may determine whether to skip the active code detection based on the value of the aforementioned parameter (act 1409). If a determination is made that active code detection should be skipped, the finite state machine may skip the active code detection and continue with the remaining acts in the process. If a determination is made that active code detection should not be skipped, and hence should be performed, the finite state machine may direct the initiation of the active code detection, which may be performed by a programmable DSP coupled to the JDA. In this manner, while the DSP is performing the active code detection, the JDA may be simultaneously performing other operations that do not use the results of the active code detection, such as constructing the matched filter output y2 (act 1408).

The finite state machine may then wait for the active code detection to be completed (act 1410), wherein, as previously described, in some embodiments, the active code detection may be performed by a component other than the JDA, for example a programmable DSP. When the active code detection is complete, the finite state machine may control the rescaling and reordering of the matched filter outputs y1, y2, and the V matrix (act 1412). The finite state machine may then proceed with a Cholesky decomposition, wherein the finite state machine may similarly control the multiple pipelined stages so as to perform the decomposition (act 1414). The finite state machine may then proceed with the computations that may be involved to solve the linear equation A*x1=y1 for the value of x1, wherein the finite state machine may similarly control the multiple pipelined stages so as to perform computations involved in solving the linear equation (act 1416). The finite state machine may proceed with the extraction of user data from the solution x1 (act 1418). The finite state machine may then direct the execution of computations that may be involved in solving the linear equation A*x2=y2 for the value of x2, wherein the finite state machine may similarly control the multiple pipelined stages so as to perform computations involved in solving the linear equation (act 1420). The finite state machine may proceed with the extraction of user data from the solution x2 (act 1422). The finite state machine may then wait for the next time slot (act 1424) and proceed to repeat the process beginning again at act 1402 when a next time slot is received. It should also be appreciated that in some embodiments, loading data and control parameters (herein sometimes referred to collectively as data) for the next time-slot can occur before the end of the processing for the current time-slot. In some such embodiments, loading data and control parameters for the next time-slot can be performed as soon as the JDA has completed loading the control parameters and data for the current time-slot. Control parameters can include shift values, a parameter indicating whether active code detection should be skipped, the length of the channel (W), and/or the number of codes.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A joint detection system configured to perform joint detection of received signals, the joint detection system comprising:
   a joint detector accelerator configured to perform front-end processing of first data inputted to the joint detector accelerator and output second data resulting from the front-end processing, and wherein the joint detector accelerator is further configured to perform back-end processing using at least third data inputted to the joint detector accelerator; and
   a programmable digital signal processor (DSP) coupled to the joint detector accelerator, wherein the programmable DSP is programmed to perform at least one intermediate processing operation using the second data outputted by the joint detector accelerator, and wherein the programmable DSP is further programmed to output the third data resulting from the at least one intermediate processing operation to the joint detector accelerator.

2. The joint detection system of claim 1, wherein the at least one intermediate processing operation comprises an active code detection operation that determines a plurality of active codes for the received signals.

3. The joint detection system of claim 2, wherein the at least one intermediate processing operation further comprises a signal noise estimation operation that determines a noise estimate for the received signals.

4. The joint detection system of claim 1, wherein the joint detector accelerator is configured to receive a parameter indicative of whether an active code detection operation that determines a plurality of active codes for the received signals is to be performed.

5. The joint detection system of claim 1, wherein the programmable DSP is further programmed to perform at least one pre-processing operation and send data resulting from the at least one pre-processing operation as the first data inputted to the joint detector accelerator.

6. The joint detection system of claim 5, wherein the at least one pre-processing operation comprises a channel estimation operation that determines an initial channel estimate comprising a plurality of channel estimates corresponding to a plurality of propagation channels.

7. The joint detection system of claim 6, wherein the at least one pre-processing operation comprises a pre-scaling operation that pre-scales the plurality of channel estimates corresponding to the plurality of propagation channels so as to generate pre-scaled channel estimates, and wherein at least some of the plurality of channel estimates are pre-scaled with different scaling factors.

8. The joint detection system of claim 5, wherein the at least one pre-processing operation comprises a midamble interference cancellation operation.

9. The joint detection system of claim 1, wherein the joint detector accelerator is further configured to perform at least one processing operation after outputting the second data and before receiving the third data.

10. The joint detection system of claim 1, wherein the first data comprises at least one data field and at least one control parameter.

11. The joint detection system of claim 1, wherein the front-end processing and the back-end processing comprise processing operations for a TD-SCDMA communication scheme.

12. The joint detection system of claim 1, wherein the back-end processing comprises a user data extraction operation that outputs data associated with a user.

13. A joint detector accelerator configured to perform at least some processing associated with joint detection of received signals, the joint detector accelerator comprising:
a processor configured to
    perform front-end processing of first data inputted to the joint detector accelerator and output second data resulting from the front-end processing and
    perform back-end processing using at least third data inputted to the joint detector accelerator, wherein the third data is at least partially based on the second data.

14. The joint detector accelerator of claim 13, wherein the third data comprises an indication of active codes for the received signals.

15. The joint detector accelerator of claim 14, wherein the third data comprises a signal noise estimate for the received signals.

16. The joint detector accelerator of claim 13, wherein the first data comprises data resulting from pre-processing of the received signals.

17. The joint detector accelerator of claim 16, wherein the first data comprises a plurality of channel estimates corresponding to a plurality of propagation channels.

18. The joint detector accelerator of claim 16, wherein the first data comprises a pre-scaled plurality of channel estimates corresponding to a plurality of propagation channels.

19. The joint detector accelerator of claim 16, wherein the first data comprises data resulting from midamble interference cancellation of the received signals.

20. The joint detector accelerator of claim 13, wherein the first data comprises at least one data field and at least one control parameter.

21. A method of performing joint detection of received signals using a joint detector accelerator, the method comprising:
    receiving first data using the joint detector accelerator;
    performing, using the joint detector accelerator, front-end processing of the first data resulting in second data, wherein the front-end processing includes at least some operations of the joint detection of the received signal;
    outputting, using the joint detector accelerator, second data resulting from the front-end processing;
    receiving, using the joint detector accelerator, third data at least partially based on the second data; and
    performing, using the joint detector accelerator, back-end processing using at least the third data, wherein the back-end processing includes at least some other operations of the joint detection of the received signal.

22. The method of claim 21, further comprising:
    performing an active code detection for the received signals using the second data and resulting in the third data.

23. The method of claim 22, further comprising:
    performing a signal noise estimation for the received signals.

24. The method of claim 23, wherein performing a signal noise estimation for the received signals comprises performing the signal noise estimation for the received signals using the third data.

25. The method of claim 21, further comprising:
    pre-processing the received signals resulting in the first data.

26. The method of claim 25, wherein the pre-processing comprises performing a channel estimation that determines an initial channel estimate comprising a plurality of channel estimates corresponding to a plurality of propagation channels.

27. The method of claim 26, wherein the pre-processing comprises pre-scaling the plurality of channel estimates corresponding to the plurality of propagation channels so as to generate pre-scaled channel estimates, and wherein at least some of the plurality of channel estimates are pre-scaled with different scaling factors.

28. The method of claim 25, wherein the pre-processing comprises performing midamble interference cancellation.

* * * * *